(12) United States Patent
Teetzel et al.

(10) Patent No.: US 7,219,370 B1
(45) Date of Patent: May 22, 2007

(54) HELMET MOUNTING SYSTEMS

(75) Inventors: James W. Teetzel, York, ME (US); Gary M. Lemire, Lee, NH (US); David G. Kent, Virginia Beach, VA (US); Marion H. Van Fosson, Rockwall, TX (US)

(73) Assignee: Wilcox Industries Corp., Newington, NH (US)

( * ) Notice: Subject to any disclaimer, the term of this patent is extended or adjusted under 35 U.S.C. 154(b) by 329 days.

(21) Appl. No.: 10/959,906

(22) Filed: Oct. 6, 2004

Related U.S. Application Data

(60) Provisional application No. 60/509,136, filed on Oct. 6, 2003.

(51) Int. Cl.
*A42B 3/04* (2006.01)

(52) U.S. Cl. ............... 2/6.2; 2/422; 359/409; 359/815

(58) Field of Classification Search ............... 2/6.1, 2/6.2, 6.6, 422, 209.13; 359/409, 815; 224/181, 224/182, 908, 909; 396/423
See application file for complete search history.

(56) References Cited

U.S. PATENT DOCUMENTS

| | | | |
|---|---|---|---|
| 4,449,787 A | | 5/1984 | Burbo et al. |
| 4,689,834 A | * | 9/1987 | McCarthy et al. ............... 2/6.2 |
| 4,901,210 A | * | 2/1990 | Hanabusa .................... 362/106 |
| 5,467,479 A | | 11/1995 | Mattes |
| 5,471,678 A | | 12/1995 | Dor |
| 5,506,730 A | | 4/1996 | Morley et al. |
| 5,535,053 A | | 7/1996 | Baril et al. |
| 5,542,627 A | | 8/1996 | Crenshaw et al. |
| 5,703,354 A | | 12/1997 | Wannagot et al. |
| 5,914,816 A | | 6/1999 | Soto et al. |
| 6,457,179 B1 | | 10/2002 | Prendergast |
| 6,472,776 B1 | | 10/2002 | Soto et al. |
| 6,560,029 B1 | * | 5/2003 | Dobbie et al. ............... 359/631 |
| 6,662,370 B1 | * | 12/2003 | Buchanan, Jr. ................ 2/6.2 |

FOREIGN PATENT DOCUMENTS

FR    2677604 A1 * 12/1992

* cited by examiner

*Primary Examiner*—Rodney M. Lindsey
(74) *Attorney, Agent, or Firm*—McLane, Graf, Raulerson & Middleton, PA

(57) ABSTRACT

Pivoting helmet mounts for an optical device are provided. In one aspect, a breakaway connector which is selectively configurable between breakaway and nonbreakaway configurations is provided. In a further aspect, a strap mount system for securing the helmet mount to the helmet employs a rotating ratchet assembly to adjust tension in the strap. In another aspect, a helmet mount for an optical device comprises a track assembly attached to a helmet to allow stowing of the optical device in a further retracted position. The track mount system may further include electrical connectors for attaching a power supply and an electronic device. In another aspect, a mounting bracket allows helmet-mounted optics to be shared with a weapon accessory mount. In a further aspect, a optical sighting device for a weapon combines a reflex sight a night vision goggle to allow targeting at night or in other low-light conditions.

8 Claims, 31 Drawing Sheets

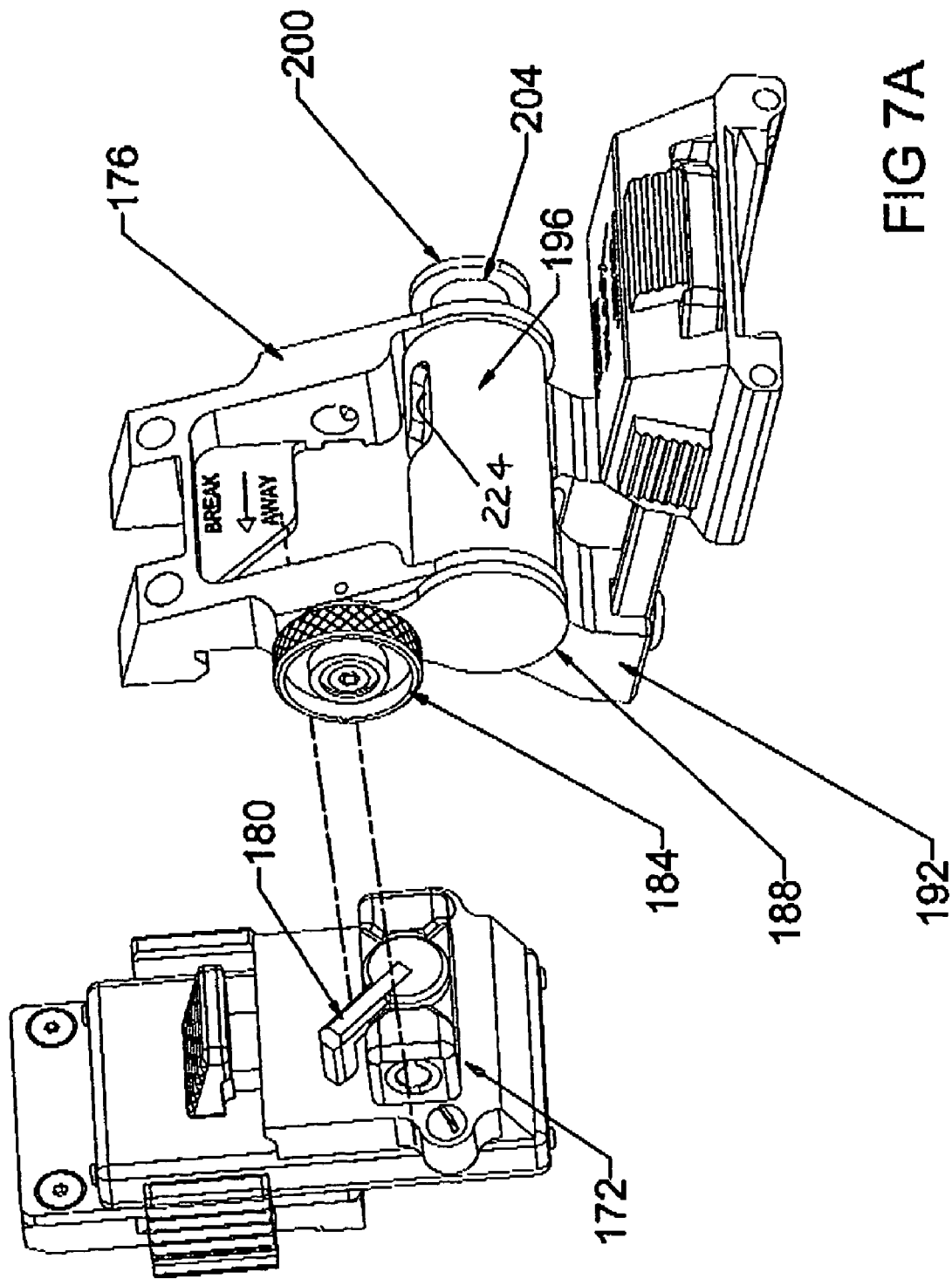

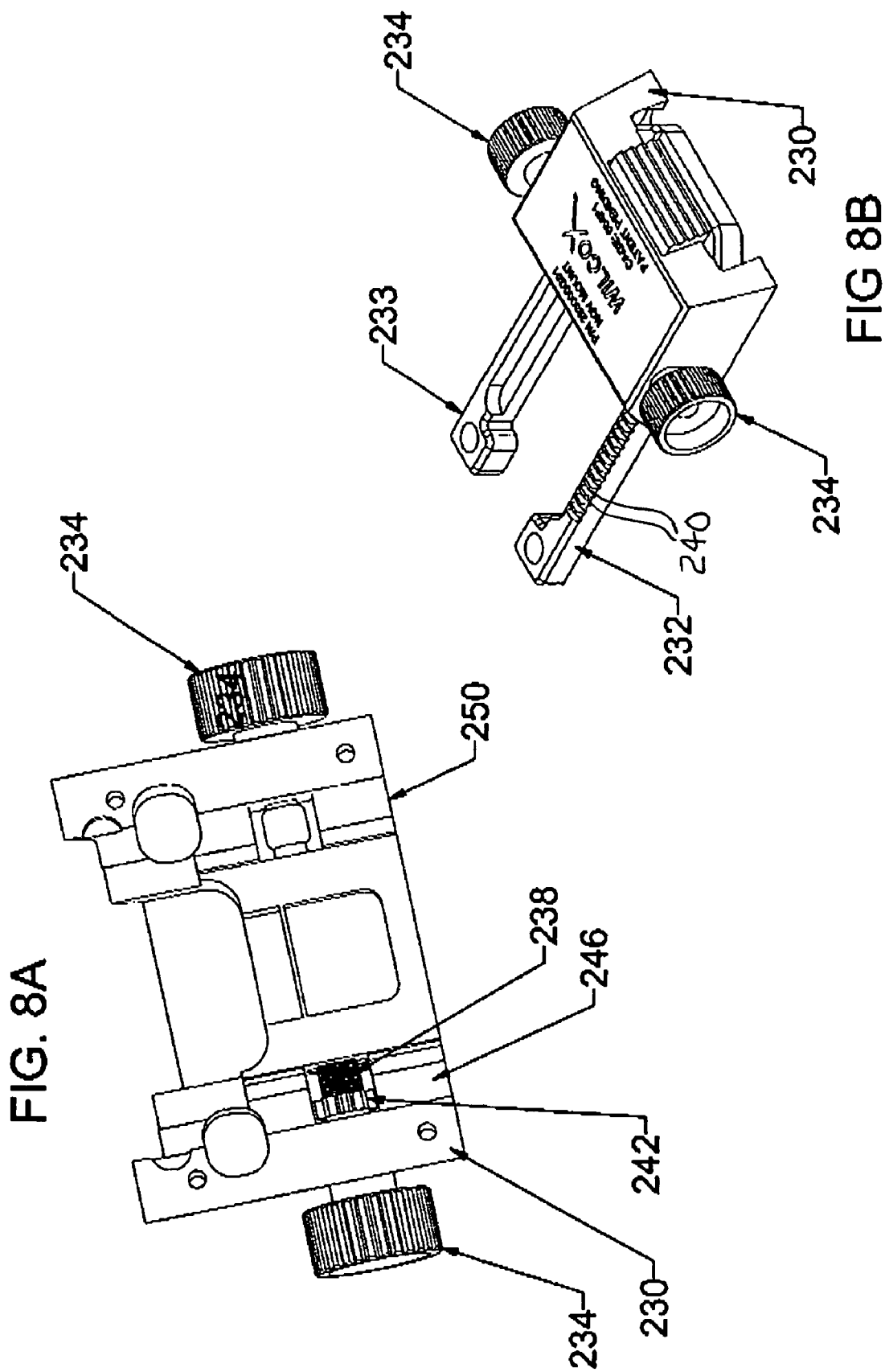

HELMET MOUNTING SYSTEMS

CROSS-REFERENCE TO RELATED APPLICATIONS

This application claims the benefit under 35 U.S.C. § 119(e) of U.S. provisional application Ser. No. 60/509,136 filed Oct. 6, 2003. The aforementioned provisional application is incorporated herein by reference in its entirety.

FIELD OF THE INVENTION

The present invention relates to helmet mounting systems and methods that integrate an optical vision device with a field helmet for alternately supporting the optical device in an operational position in front of the user's eyes and a stowed position out of the user's line of vision.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

FIGS. 7A and 7B are exploded views illustrating a breakaway mechanism according to a preferred embodiment of the present invention.

FIGS. 8A and 8B illustrate an alternative horizontal adjustment mechanism according to the present invention.

DETAILED DESCRIPTION OF THE PREFERRED EMBODIMENTS

Figure 1:
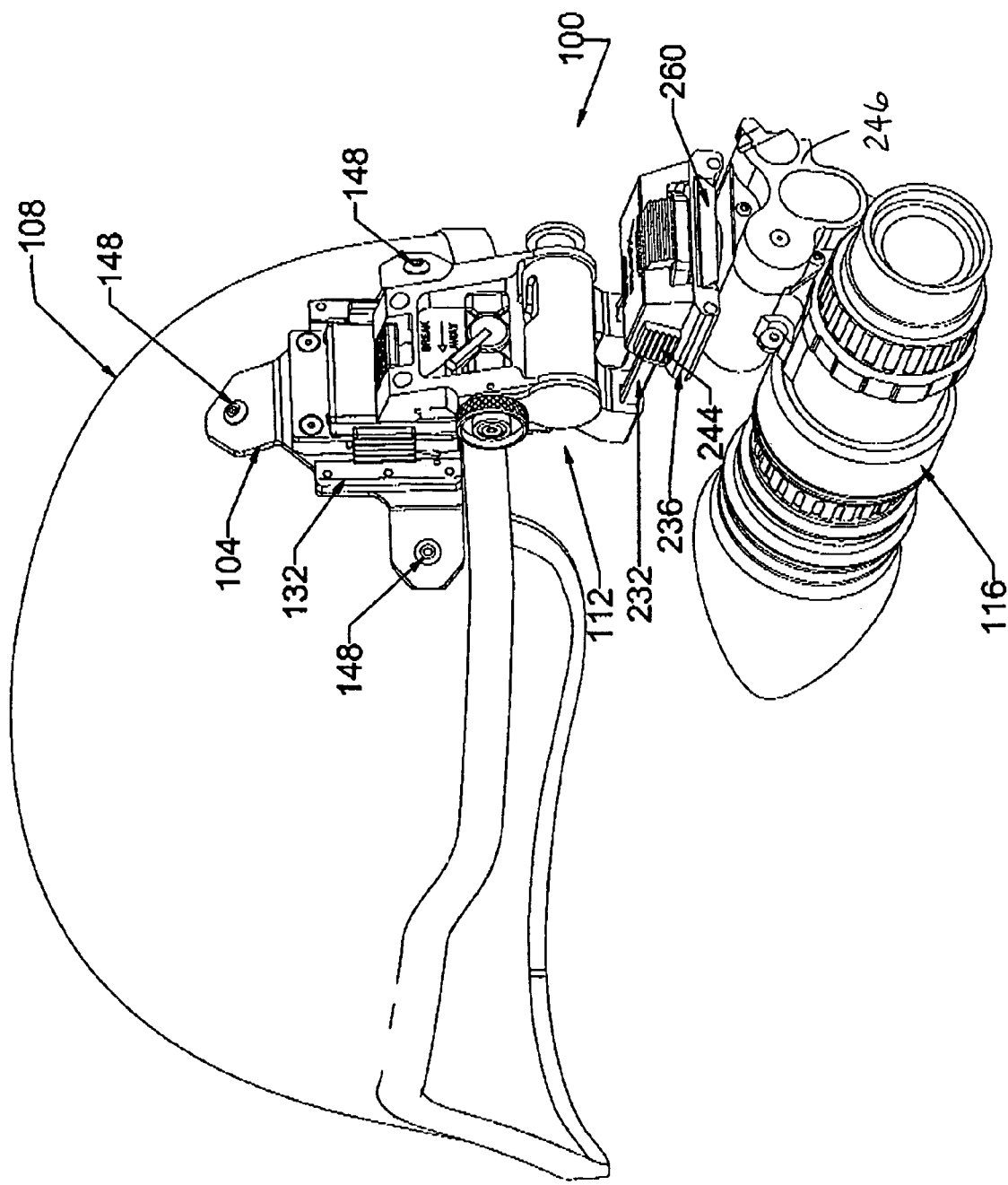
FIG. 1 is a front perspective view of a helmet carrying a helmet mount according to one embodiment of the present invention, wherein the helmet mount supports viewing optics in an operational or viewing position.
Figure 2:
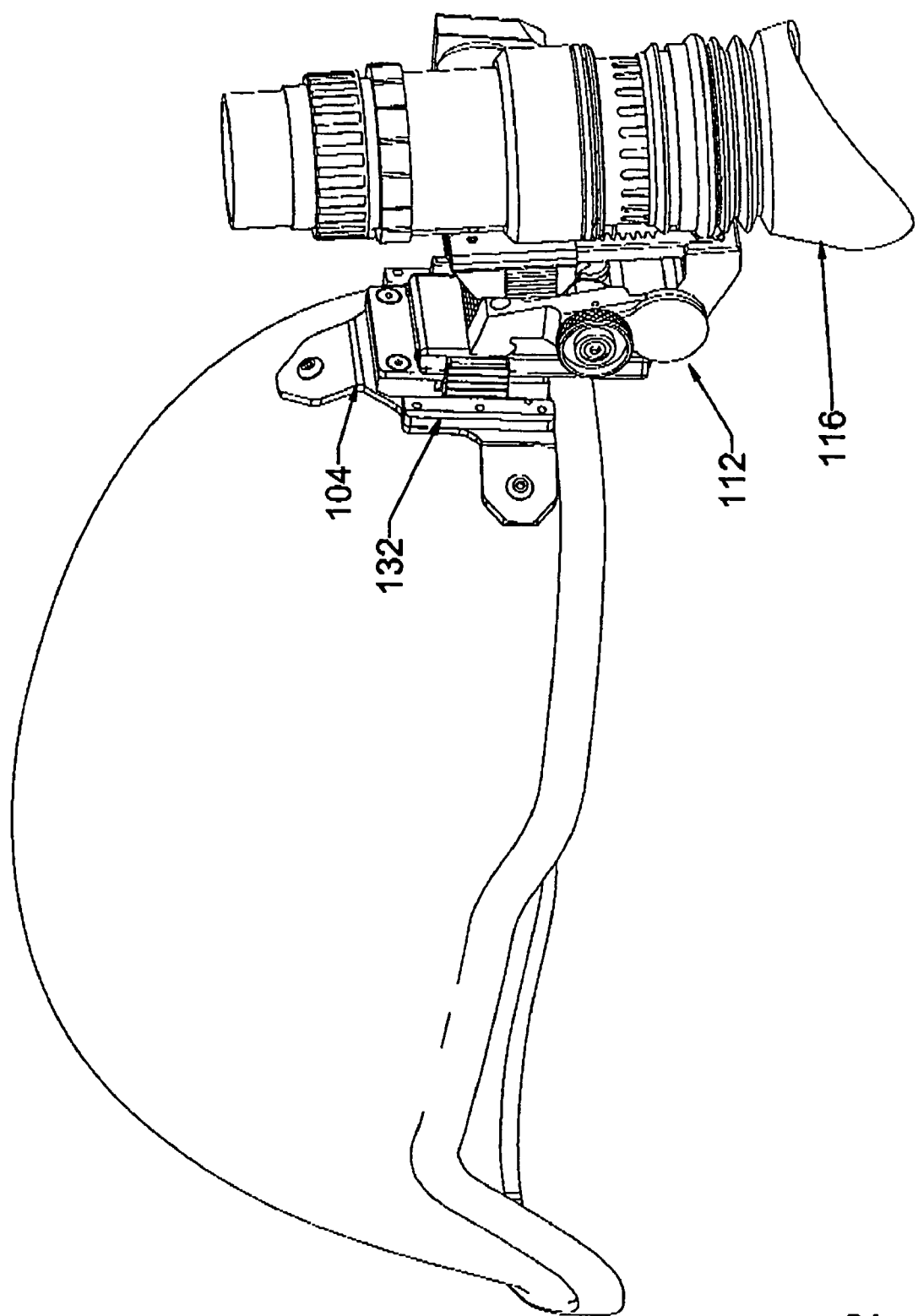
FIG. 2 is a front perspective view of the embodiment shown in FIG. 1, wherein the viewing optics are rotated to the stowed position.
Figure 3:
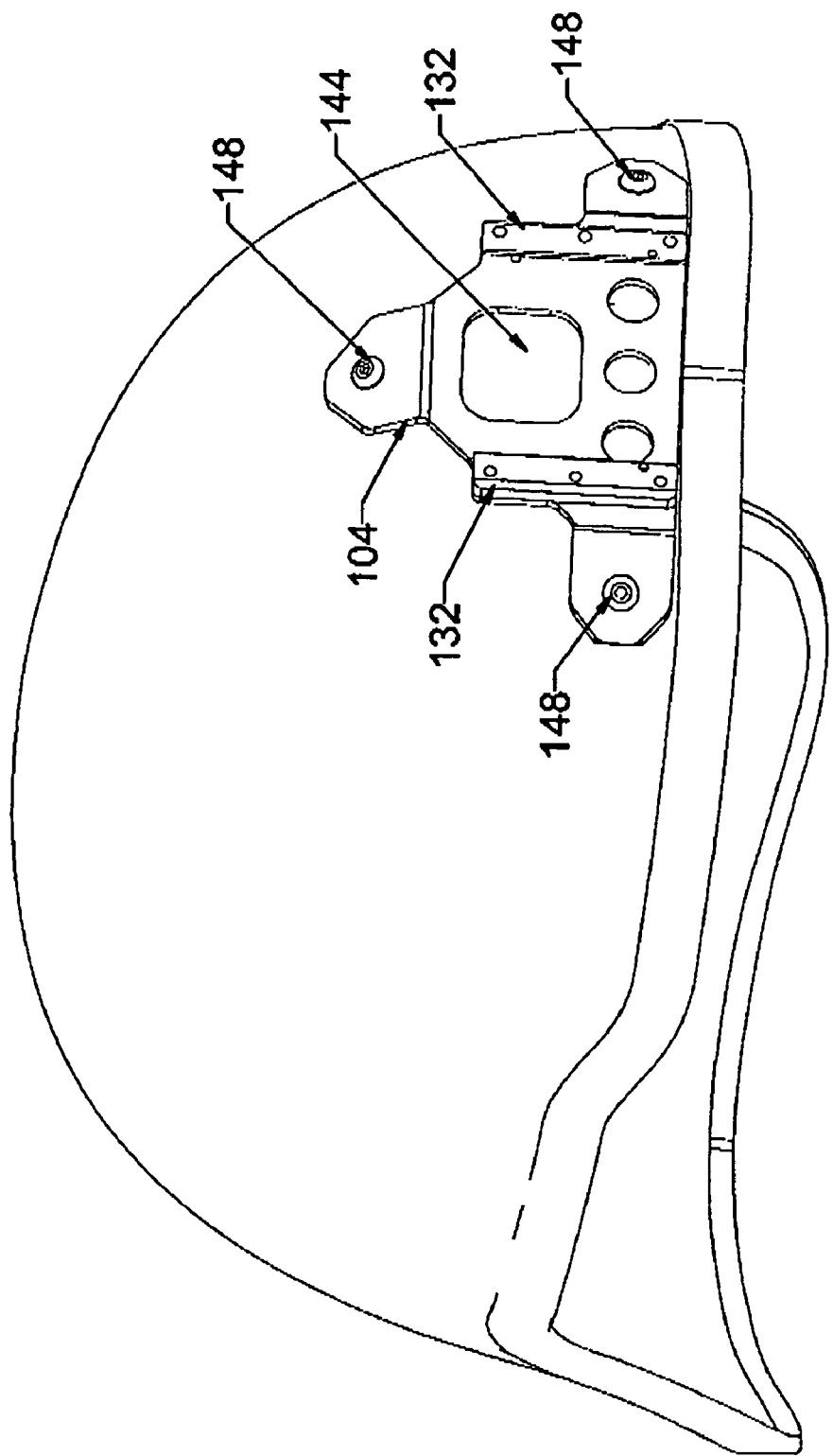
FIG. 3 is a front perspective view of the helmet shown in FIGS. 1 and 2 having a helmet mount base plate fastened thereto, wherein the optical device and the remainder of the mounting assembly has been selectively removed therefrom.

Referring now to the drawing FIGURES, wherein like reference numerals refer to like or analogous components throughout the several views, and with particular reference to FIGS. 1–3, there appears a first exemplary helmet mounting system embodiment 100 of the present invention. The helmet mounting system 100 includes a connection plate assembly 104 attached to the front portion of a helmet 108.

A pivoting helmet mount 112 is removably attached at a first end to the connection plate 104 and at a second end to an optical device 116. The present invention is shown with a monocular night vision goggle, e.g., employing a single image intensifier tube and associated optics, for ease of exposition, however, it will be understood that the invention can be used with other types of sighting devices, such as a monocular or binoculars, helmet mounted display screen, head-up display or any other helmet mounted optical, electro-optical, and/or viewing devices.

The purpose of the mounting system is to position the optical device 116 so that it is movable between an operational or viewing position as shown in FIG. 1 and a stowed position as shown in FIG. 2, thereby allowing the operator to reposition the optical device without the need to remove the helmet.

Figure 4:
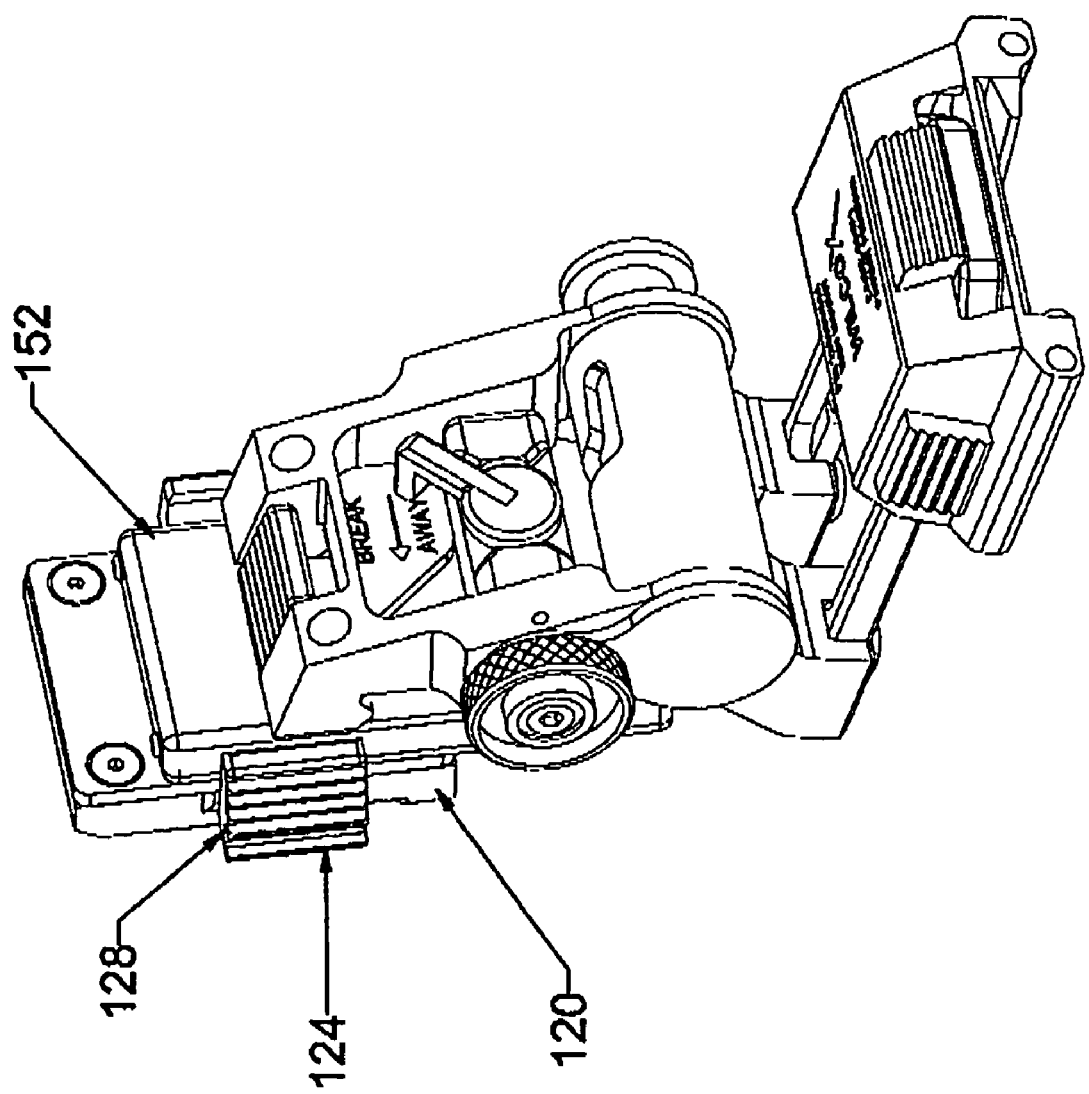
FIG. 4 is a front perspective view of the mounting assembly shown in FIG. 1.
Figure 5:
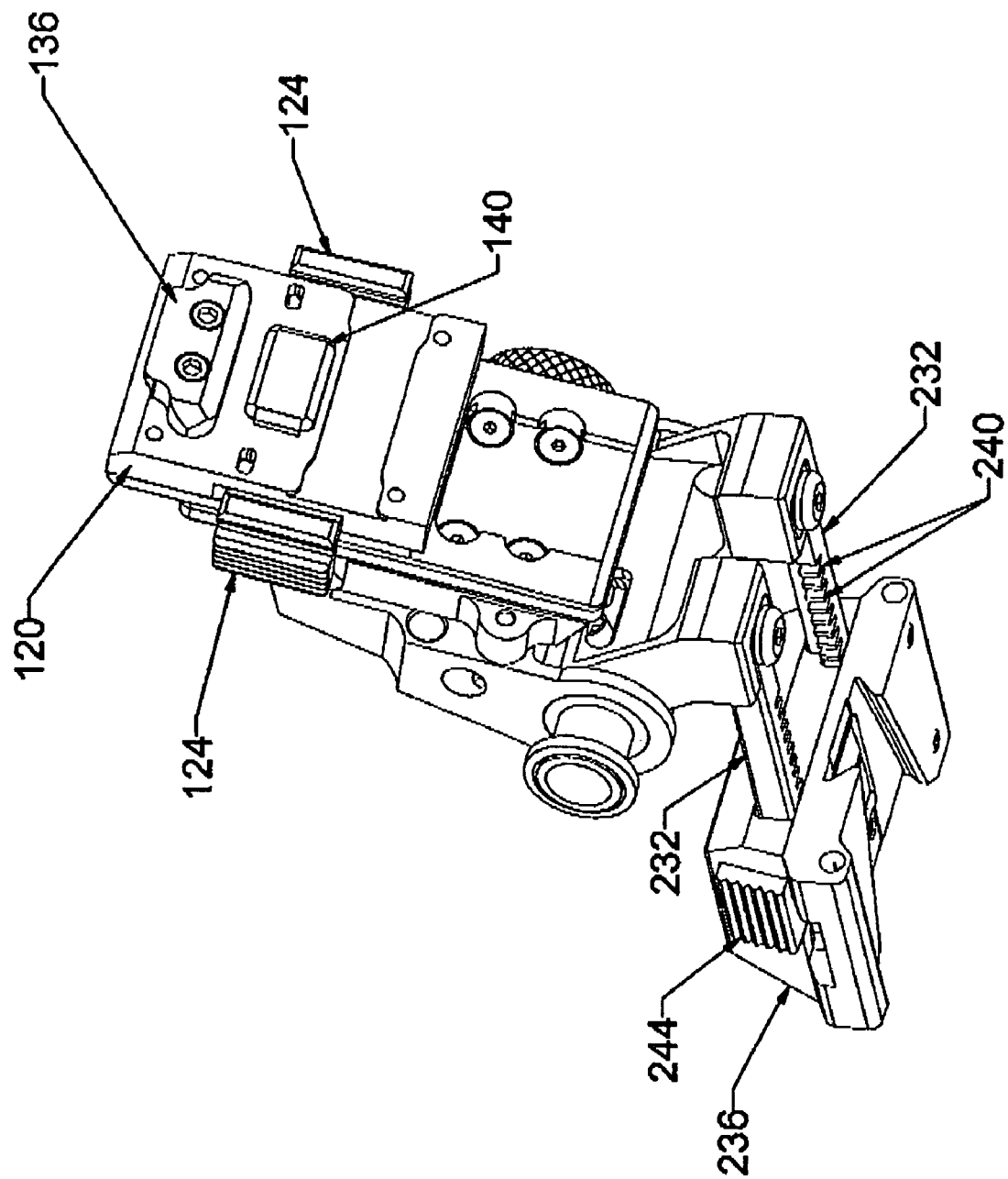
FIG. 5 is a rear perspective view of the mounting assembly shown in FIG. 4.
Figure 6A:
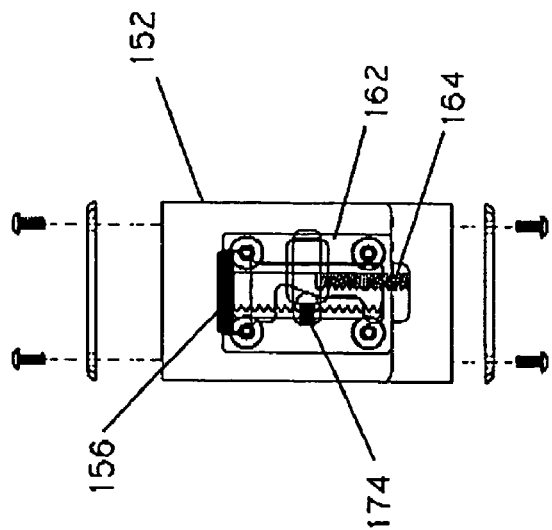
FIGS. 6A and 6B are front and exploded side views, respectively, of a vertical adjustment mechanism according to an embodiment of the present invention.
Figure 6B:
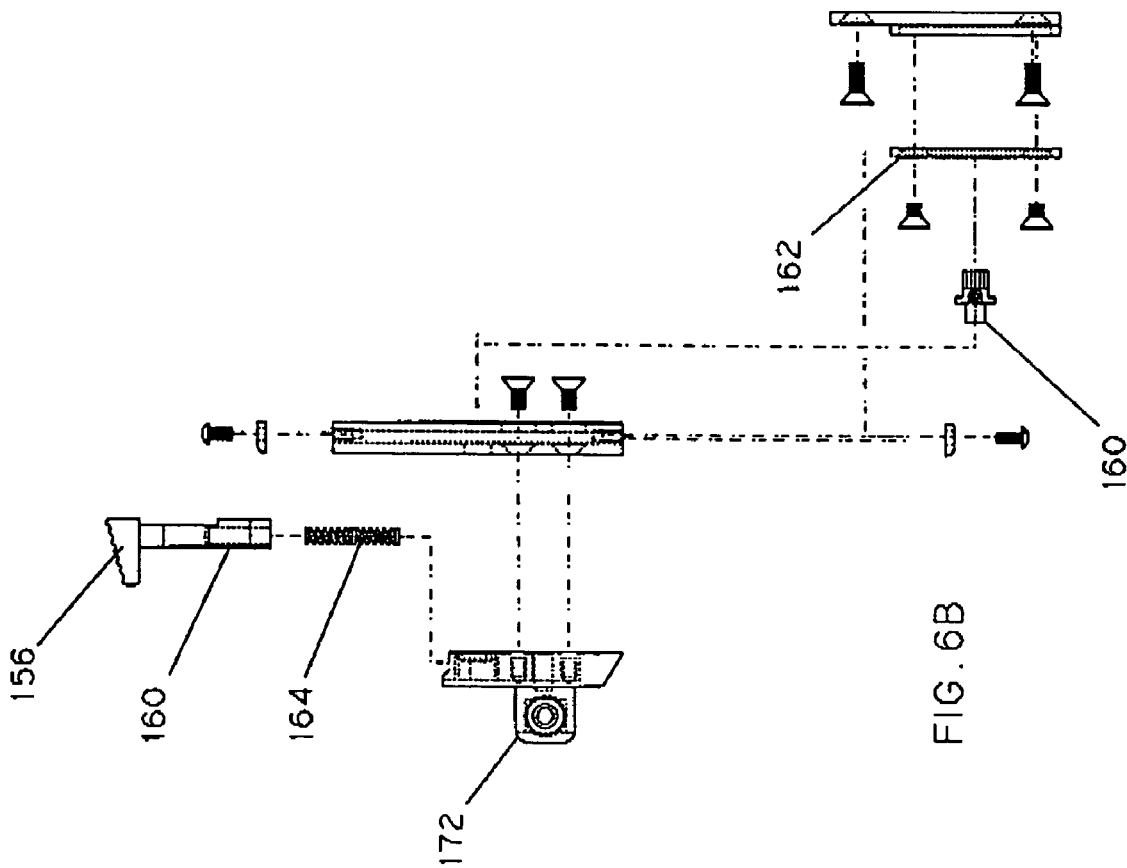
Figure 6C:
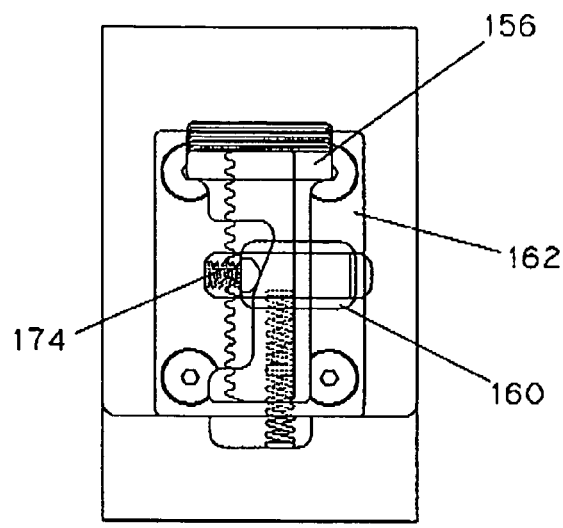
FIG. 6C is an enlarged view of the vertical adjustment mechanism shown in FIGS. 6A and 6B.
Figure 6D:
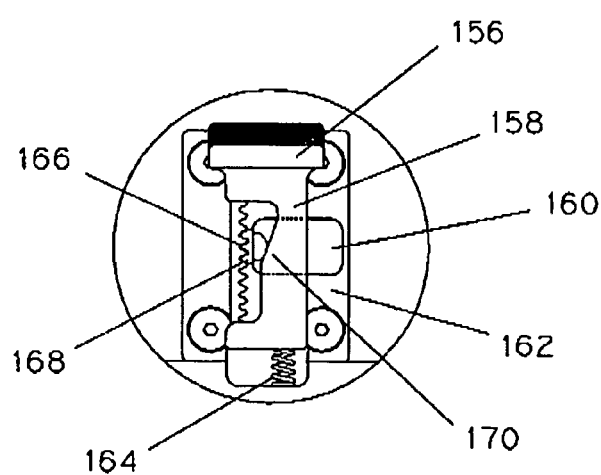
FIGS. 6D and 6E are enlarged views of the vertical adjustment mechanism shown in FIGS. 6A–6C in the respective locked and unlocked positions.
Figure 6E:
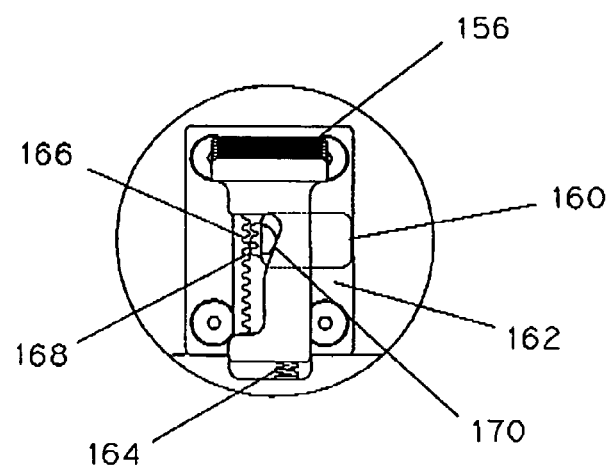

With reference now to FIGS. 4 and 5, and with continued reference to FIGS. 1–3, the pivoting helmet mount 112 includes a helmet interface assembly 120 that interfaces with the mounting plate 104. The mounting assembly 120 includes resilient buttons 124 having grooves or channels 128 formed therealong. The grooves 128 mate with guide rails 132 formed on the plate 104. A locking member 136 engages an aligned opening 144 formed in the plate 104 and a tensioning member 140 such as a resilient button may be provided to prevent movement or rattling between interface assembly 120 and the plate 104. The connection plate assembly 104 couples to the helmet 108 utilizing mechanical fasteners 148, such as screws, rivets, clips, dogs, pawls, or the like.

The helmet interface assembly 120 includes a sliding plate 152 which slides horizontally with respect to the helmet interface assembly 120. The sliding plate is selectively positionable to provide a vertical adjustment of the optical device relative to the eyes of a wearer.

As best seen in FIGS. 6A–6E, an actuator button 156 is coupled to sliding cam or lever 158 which selective urges a gear rack lock member 160 toward gear rack 162 to prevent movement of the sliding plate 120. When the button 156 is manually depressed against the urging of spring 164, the teeth 166 of the gear lock member 160 are urged out of engagement with the gear rack, allowing the sliding plate to be moved to a desired vertical position.

The lever 158 is held in the locked position (upper position in the orientation shown) by tension from spring 164. When the lever 158 is in the locked position, the cam surface 170 forces the gear rack lock 160 to compress spring 174, which bears on the lock 160, thus engaging the gear rack lock teeth 166 into the teeth 168 of the gear rack 162. When the operator desires to change the vertical position of the helmet mount, he/she presses the button 156 downward, thus compressing spring 164. The spring 174 pushes the gear rack lock 160 away from the gear rack 160, thus allowing the helmet mount to be repositioned to a different vertical location within the upper and lower adjustment limits. When the operator selects the correct vertical location for the helmet mount, the button 156 is released. The spring 164 forces the lever 158 back into the locked position, and the cammed surface 170 causes the gear rack lock 160 to compress spring 174 whereby the toothed portion 166 of the lock engages the teeth 168 of the gear rack to lock the helmet mount sliding plate assembly in the selected vertical position.

Figure 7B:
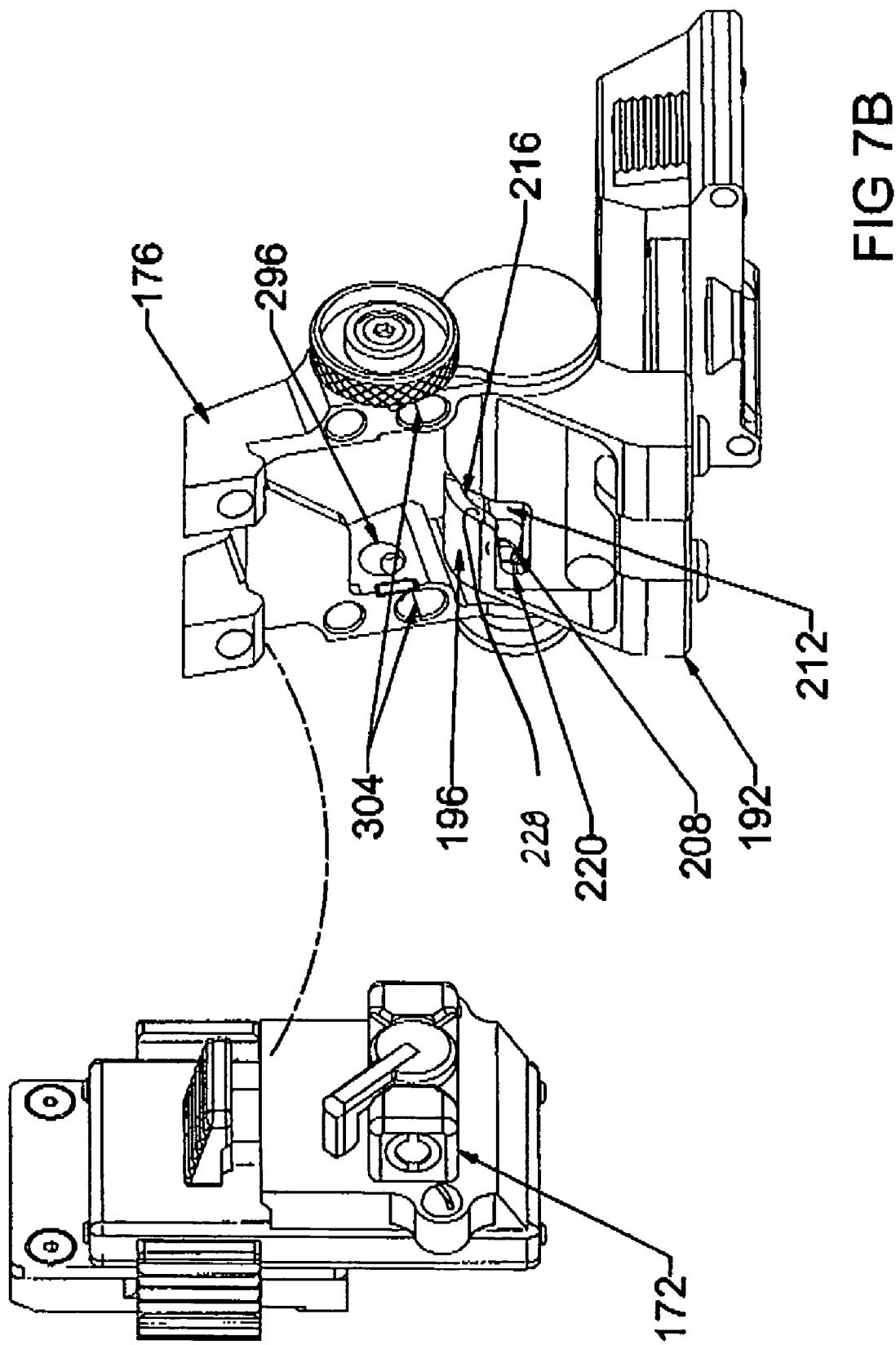

The sliding plate 152 also carries a user-selectable breakaway assembly 172, as best seen in FIGS. 7A and 7B. The breakaway assembly provides an interface between a first pivot arm 176 and the sliding plate assembly 120. The connection between the breakaway assembly and the pivot arm 176 may be selectively configured as a breakaway connection or a rigid attachment by moving lever 180, as will be described in greater detail below.

An angle or tilt adjustment knob 184 includes a threaded rod (not shown) rotatably engaging a mating threaded opening in the pivot arm 176. The arm 176 rotates relative to plate 188, which includes an elongate or curvate opening or slot (not shown) receiving the threaded rod. Loosening the knob 184 allows adjustment of the optics to a desired tilt angle according to user's eye position and a desired line of sight, whereby the tilt angle may then be secured in the desired position by tightening the knob 184.

A second pivot arm 192 is pivotally attached to the first pivot arm 176. The second pivot arm 192 includes an outer, generally cylindrical sleeve 196 which rotates with respect to a pivot pin assembly 200. The pivot pin assembly 200 includes a central rod 204 coaxial with the pivot axis and carrying a protruding pin 208. A generally cylindrical sleeve or bushing 212 is coaxially disposed intermediate the sleeve 196 and the axial rod 204. The bushing 212 includes an elongate slot 212 through which the pin 208 extends. The central rod 204 is movable in the axial direction against the urging of a captured coaxial spring (not shown) whereby the pin 208 may travel within the slot 212.

The outer sleeve 196 further includes a generally U-shaped slot 216 into which the pin 208 extends. The U-shaped slot 216 includes a rear axially extending leg 220, a front axially extending leg 224, and a base 228 extending in the radial direction between the legs 220 and 224. The pin 208 engages the rear leg portion 220 of the channel 216 when the optical device is in the operational position. Manually depressing the central rod 204 and allows the arm 192 to pivot with respect to the arm 176. Upon pivoting the unit and releasing the rod 204, the pin 208 travels to the second leg 224 whereby the optical device is retained in the flipped-up position. In a preferred embodiment, the slot 212 and the legs 220 and 224 are tapered such that they widen toward the base 228 to provide a wedging action on the pin 208 and to provide ease of operation during the pivoting operation.

The pivot arm 192 carries a pair of rails 232 extending in the horizontal position (when the helmet is worn by a user and the goggle is in the operational, i.e., flipped down, position). A sliding carriage 236 is movable along the slide rails 232 to allow the user to horizontally position the optical device at a comfortable or desired focal distance from the operator's eyes. At least one of the slide rails 232 (both in the depicted embodiment) contain a series of locking teeth 240 along its length for engaging an internal locking member such as a toothed member, pin, or the like, to provide secure retention at a selected position. Release buttons 244, biased toward the locked position, may be manually depressed to disengage the locking members to allow sliding movement of the carriage 236 until the optics are positioned at a desired focal position in front of the user's eye.

Referring now to FIGS. 8A and 8B, there is shown an alternative embodiment carriage 230 for providing the fore and aft movement and securing the optical device to the helmet mount. In this embodiment, the horizontal positioning is controlled by a rotary knob 234 that, when turned, moves the device closer to or farther away from the wearers eyes. The knob is mounted on a shaft 238 having a toothed gear 242 thereon. Parallel guide rails 232 and 233 ride in channels 246 and 250, respectively. The gear 242 engages a series of teeth 240 on the rail 232 and which extend into the channel 246, whereby the carriage 230 may be advanced or retracted along the rails 232 and 233 by manually rotating the knob 234 in the respective forward or reverse direction. It will be recognized that a variety of configurations are possible. For example, either or both of the parallel rails may include a gear rack. Likewise, the knobs 234 may be mounted on both sides of the horizontal slide, as depicted, or may be attached on one side only. For example, where a single knob 234 is provided, it may be positioned on the left side of the carriage 230 to accommodate a right hand operator, or on the right side to accommodate a left hand operator.

Figure 9:
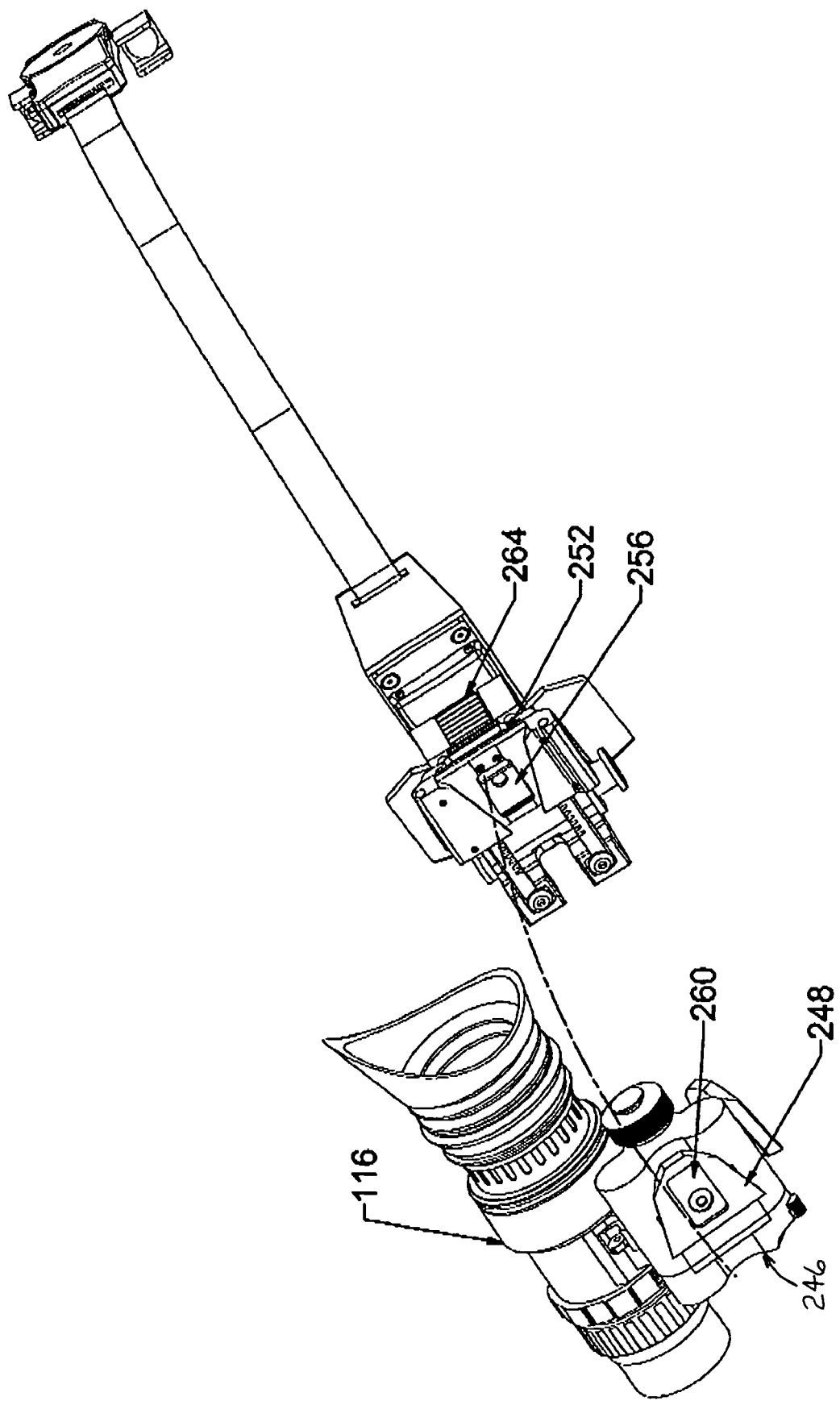
FIG. 9 is a top perspective view of a mounting system according to a further embodiment of the invention and which illustrates the manner of connecting the optical device to the mounting assembly.
Figure 10:
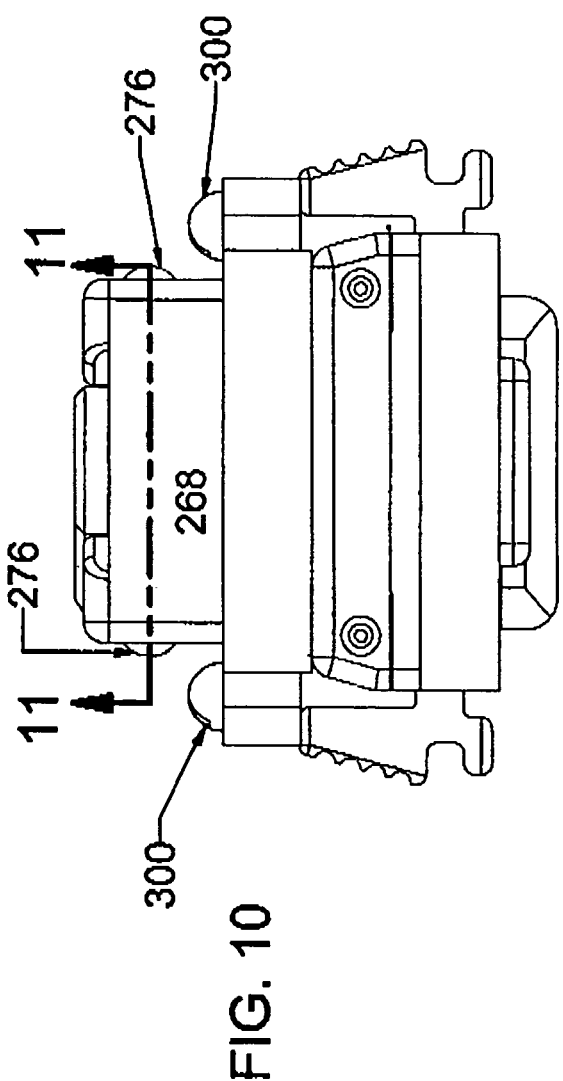
FIG. 10 is a bottom view of the vertical adjustment and breakaway assemblies.

The sliding carriage 236 or 230 is secured to the optical device 116. As best seen in FIGS. 1 and 9, the depicted viewing goggle 116 includes a central mounting member 246 for mounting the night vision tube 250. In the illustrated embodiment, the night vision tube is pivotally mounted to the mounting member 246 for aligning the optical axis of the night vision goggle with the user's eye. The mounting member 246 may additionally house a battery for providing power to operate the night vision goggle. Although the depicted embodiment is shown with a monocular night vision scope, the mounting member 246 may optionally accept a pair of night vision tubes to provide a binocular night vision goggle, which advantageously gives the viewer a perception of depth. The mounting member 246 may be of a type generally known in the art, see, e.g., U.S. Pat. No. 5,703,354. The mounting member 246 includes a mounting foot 248 for receiving a complementary mating and generally trapezoidal mounting shoe 252 located on the sliding carriage 236. A locking member 256 is resiliently biased to engage complementary recess 260 located on the mounting foot 248. An unlocking lever 264 is provided which can be used to manually disengage locking member 256 against the biasing of an internal spring (not shown) to release the optical device from the mounting unit.

As can best be seen in FIGS. 7A, 7B, and 10–12, the selectable breakaway connector 172 includes a housing member 268 housing a cam 272, which is manually rotatable via a lever 180. Balls 276 partially protrude from the housing and are captured within retaining rings 280. Coil springs 284 are housed within channels 288 formed in the housing 268 and urge the balls outwardly. The balls are prevented from escaping via inwardly extending lips 292 on the retaining rings 280.

Figure 11:
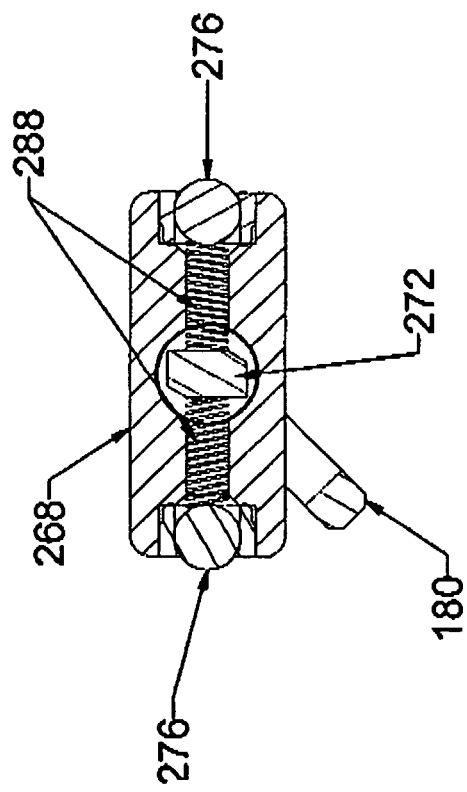
FIG. 11 is a cross-sectional view of the breakaway assembly taken along the lines 11—11 in FIG. 10, depicted in the locked or non-breakaway configuration.

When the cam 272 is rotated such that the long axis of the cam is aligned with the axes of the aligned bores 288, as shown in FIG. 11, the coils of the springs 284 are compressed to their maximum extent, whereby, the balls are not inwardly depressible. In this manner, the balls are rigidly maintained in the outward, protruding position, thereby engaging complimentary openings 296 in non-breakaway fashion.

Figure 12:
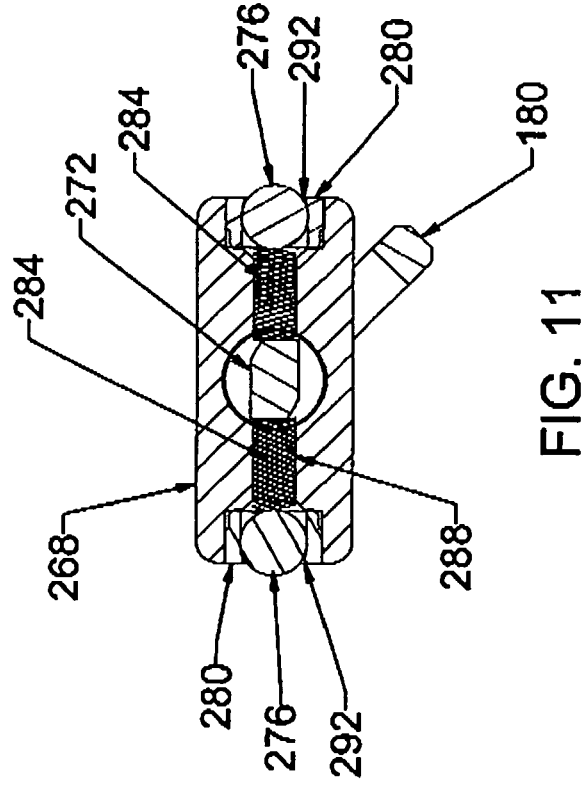
FIG. 12 is a cross-sectional view of the breakaway assembly as shown in FIG. 11, but illustrating the unlocked or breakaway configuration.

When the cam is rotated such that the long axis of the cam is perpendicular with the axes of the aligned bores 288, as shown in FIG. 12, the coils of the springs 284 are separated, thereby rendering the balls 276 resiliently depressible in the inward direction. In this manner, the balls may move inwardly against the urging of the springs, thereby allowing the breakaway unit to separate when a sufficient force is applied. The breakaway setting as shown in FIG. 12 is advantageous in that it may prevent injury to the wearer in the event of entanglement or impact of the goggle 116. Likewise, the non-breakaway setting may advantageously be selected in instances where it is desired to prevent inadvertent dislodging of the goggles from the helmet, e.g., where loss of the goggles is possible or where the operator may be subject to high accelerational or G forces. Protrusions 300 engaging complimentary aligned openings or cavities 304 may also be provided to further secure the pivot leg 176 to the breakaway assembly.

Figure 13:
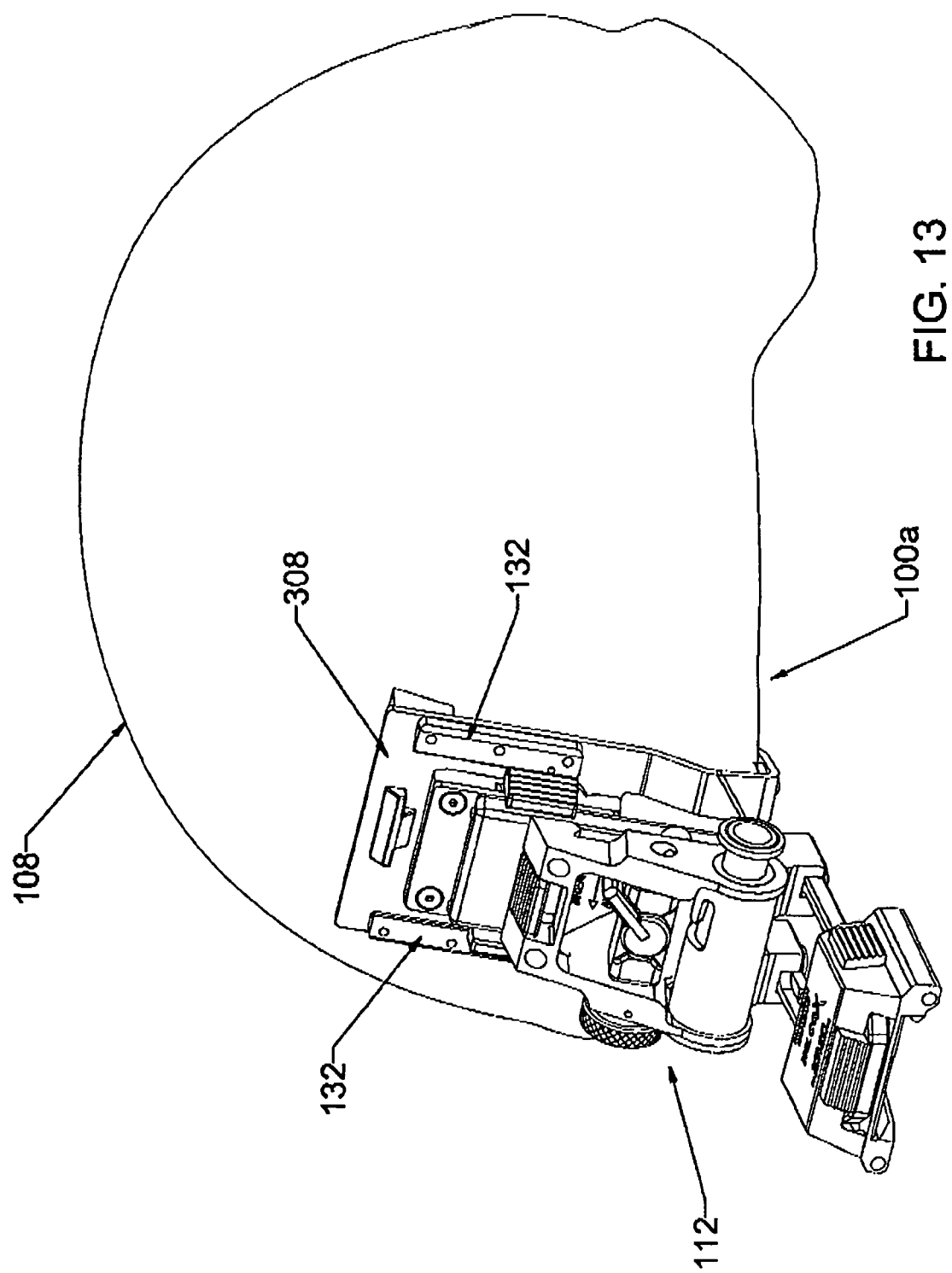
FIG. 13 is a front perspective view of a helmet carrying a helmet mount according to another embodiment of the present invention.
Figure 14:
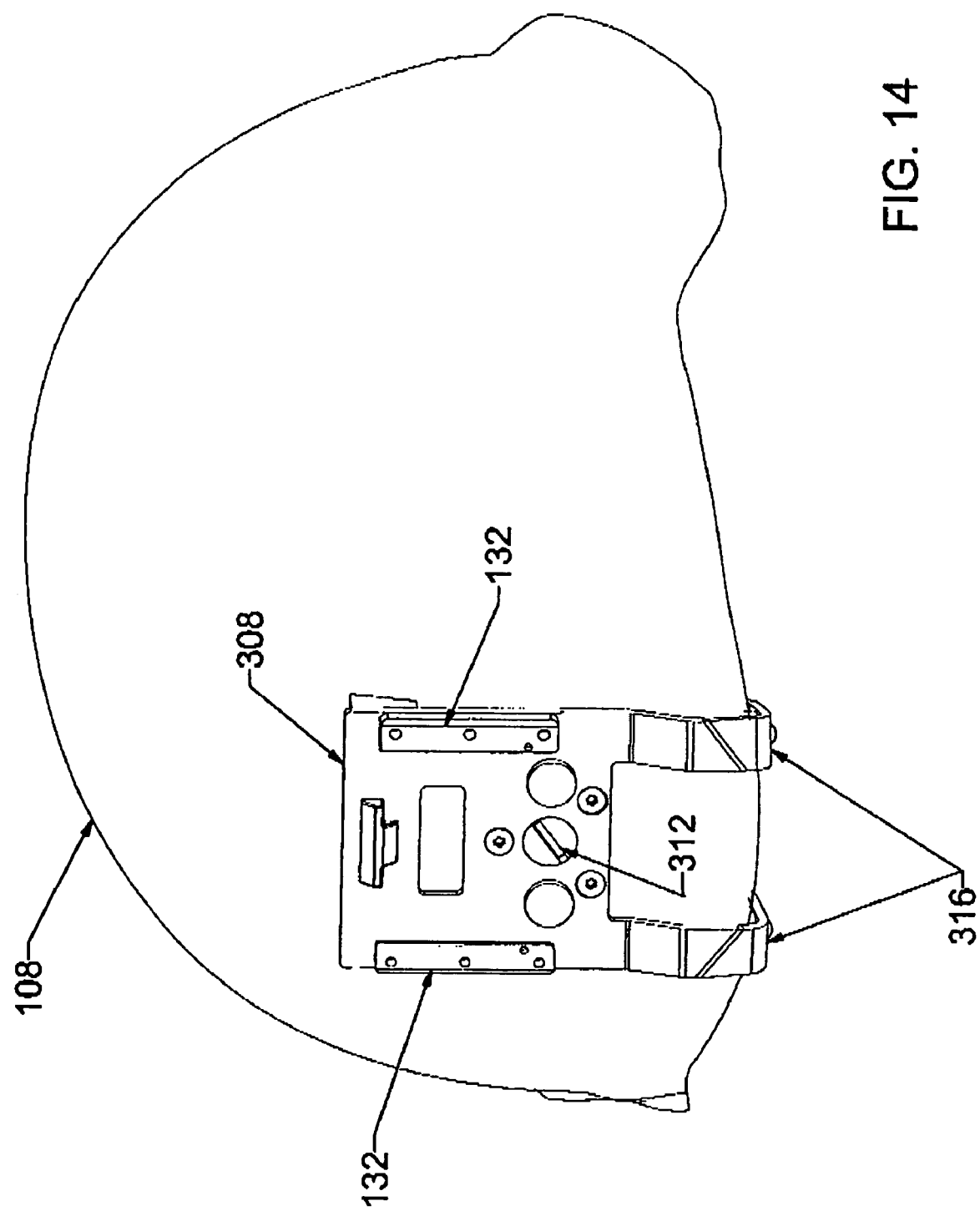
FIG. 14 is a front perspective view of the helmet shown in FIG. 13, wherein the optical device and the flip-up mounting assembly has been selectively removed therefrom.

Referring now to FIG. 13, there is shown a further embodiment helmet mount 100a including a mounting plate 308 interfacing a helmet mount 112, as detailed above, to a helmet 108. As seen in FIG. 14, the mounting plate 308 includes guide rails 132 for receiving the helmet mount assembly as described above and is secured to the front of the helmet 108 via a fastener 312, such as a threaded fastener or the like. Also, a pair of laterally spaced-apart hook members 316 engage the brim of the helmet, thereby providing three points of attachment of the plate member 308. Commonly, military helmets are provided with a single hole predrilled in the front thereof and the embodiment 100a is advantageous in that it may readily be adapted to employ such predrilled hole for receiving the fastener 312.

Figure 15:
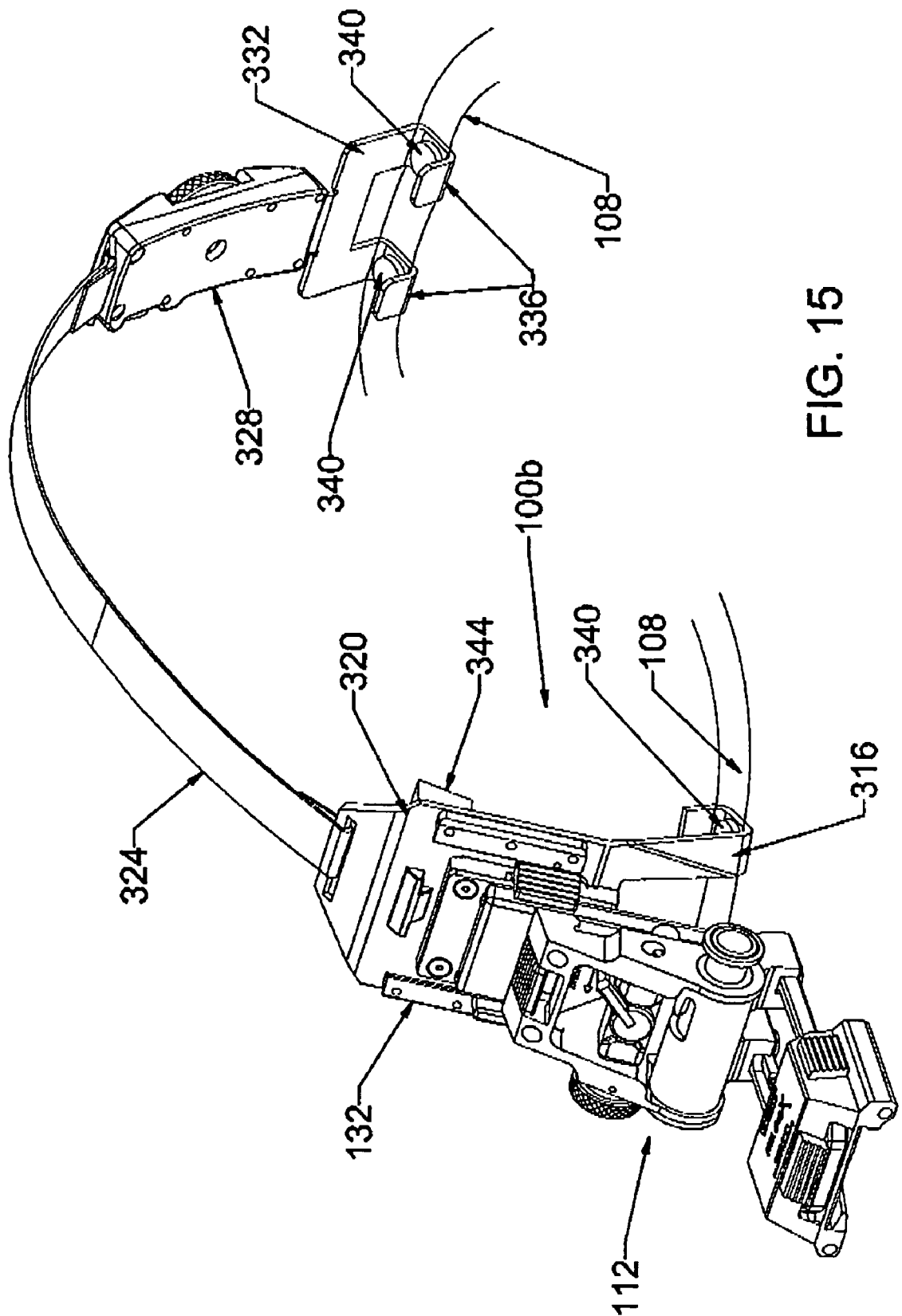
FIG. 15 is a front perspective view of a helmet mounting system according to a further embodiment of the present invention.
Figure 16:
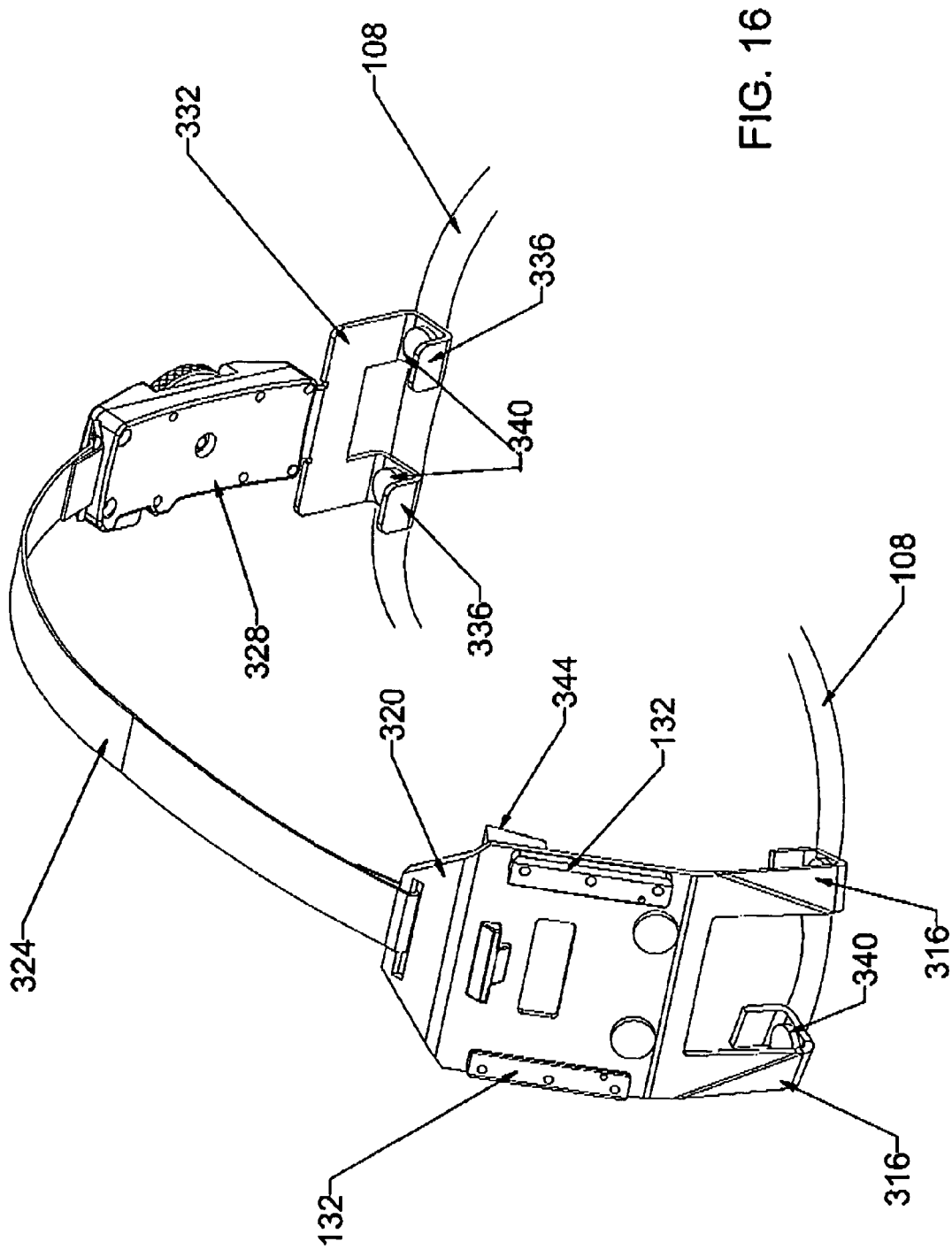
FIG. 16 is a front perspective view of the helmet mounting system shown in FIG. 15, wherein the optical device and the pivoting mounting assembly has been selectively removed therefrom.

Referring now to FIGS. 15 and 16, there appears a strap mount system 100b according to another embodiment of the present invention. A mounting plate 320 includes guide rails 132 for securing the pivoting mounting assembly 112 to the front of the helmet 108 (shown in fragmentary view) as described above. A strap 324 passes along the centerline of the helmet and attaches to a rear ratchet assembly 328 as will be described in greater detail below. The ratchet assembly 328 attaches to the rear of helmet 108 via a wrap-around bracket 332 including laterally spaced-apart hook members 336 engaging the rear brim portion of the helmet 108. The front and rear hook members 316 and 336, respectively, may include noise and/or vibration dampening members 340 formed of a flexible elastic or resilient material. In the depicted embodiment, the dampening members 340 may be pads, grommets engaging holes formed in the hook members, or the like. Other flexible or resilient dampening members such as resilient member 344 may be provided at other points of contact as well.

Figure 17:
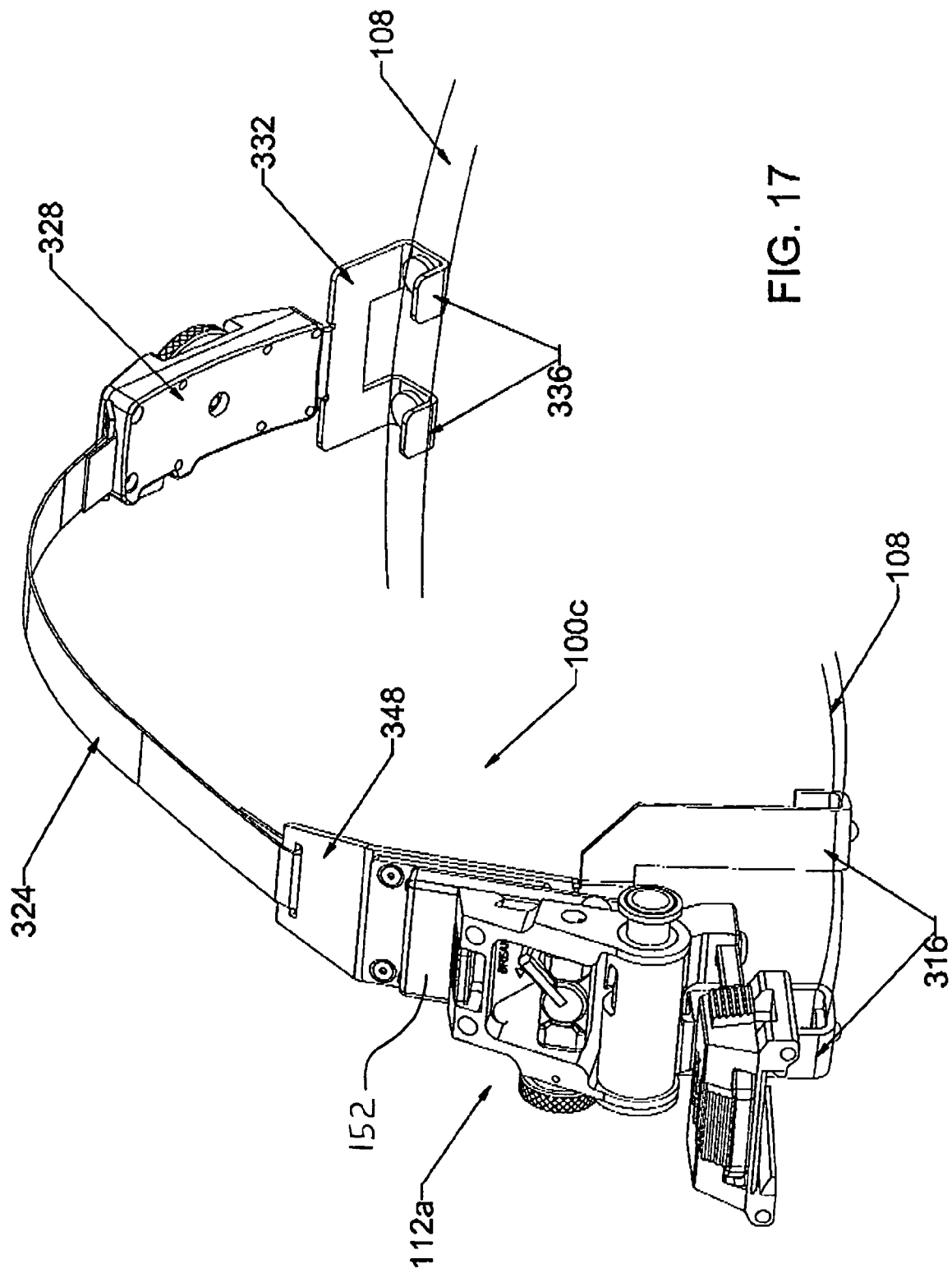
FIGS. 17 and 18 are front and rear perspective views, respectively, of a helmet mounting system according to yet another embodiment of the present invention.
Figure 18:
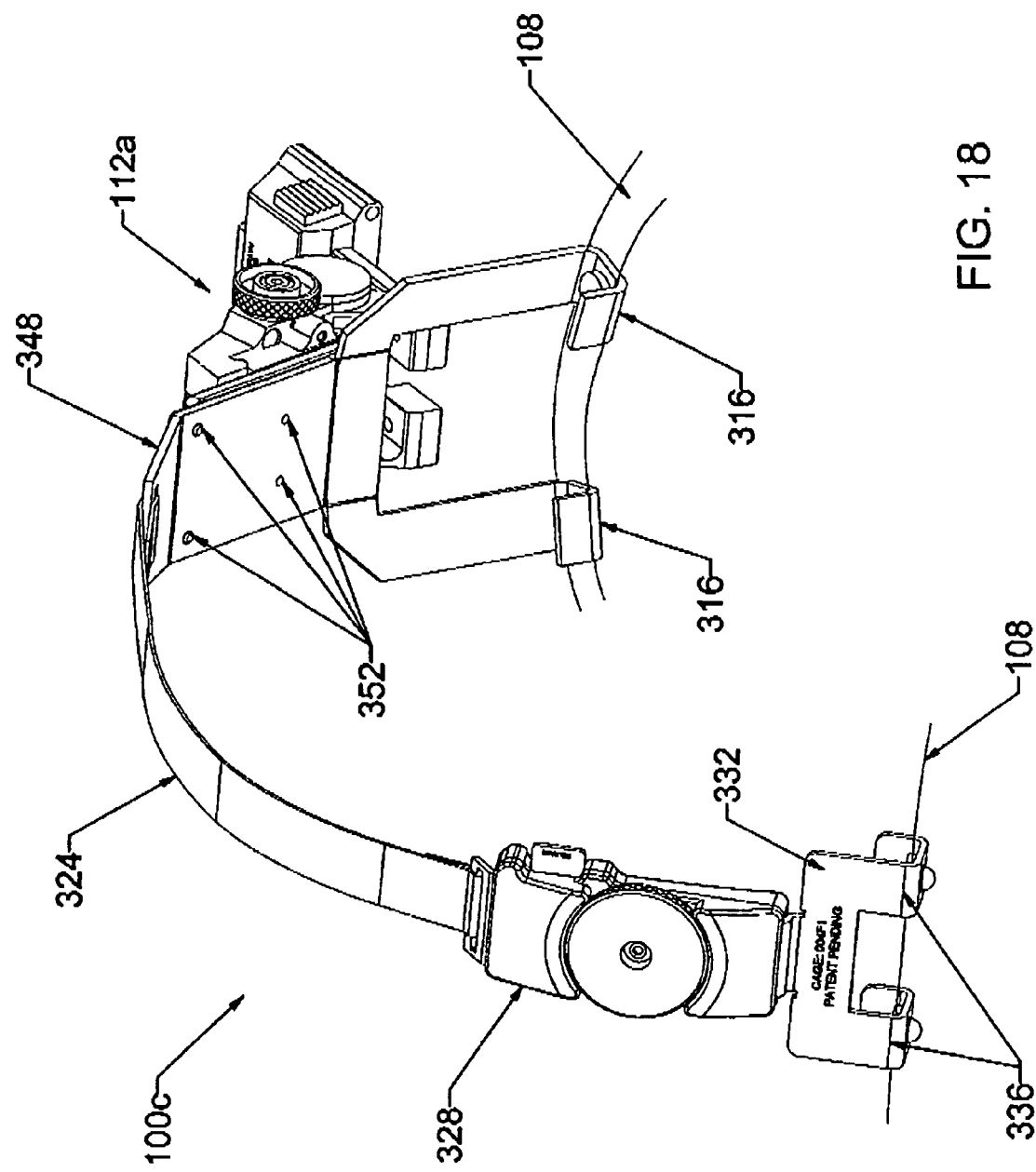
Figure 20:
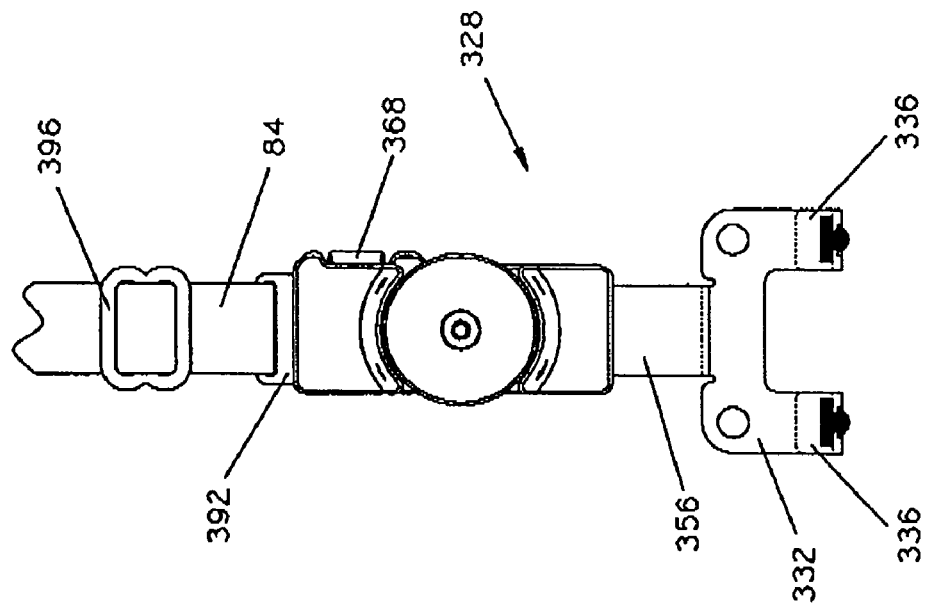
FIG. 20 is a rear view of the helmet strap ratchet system of the present invention.
Figure 19:
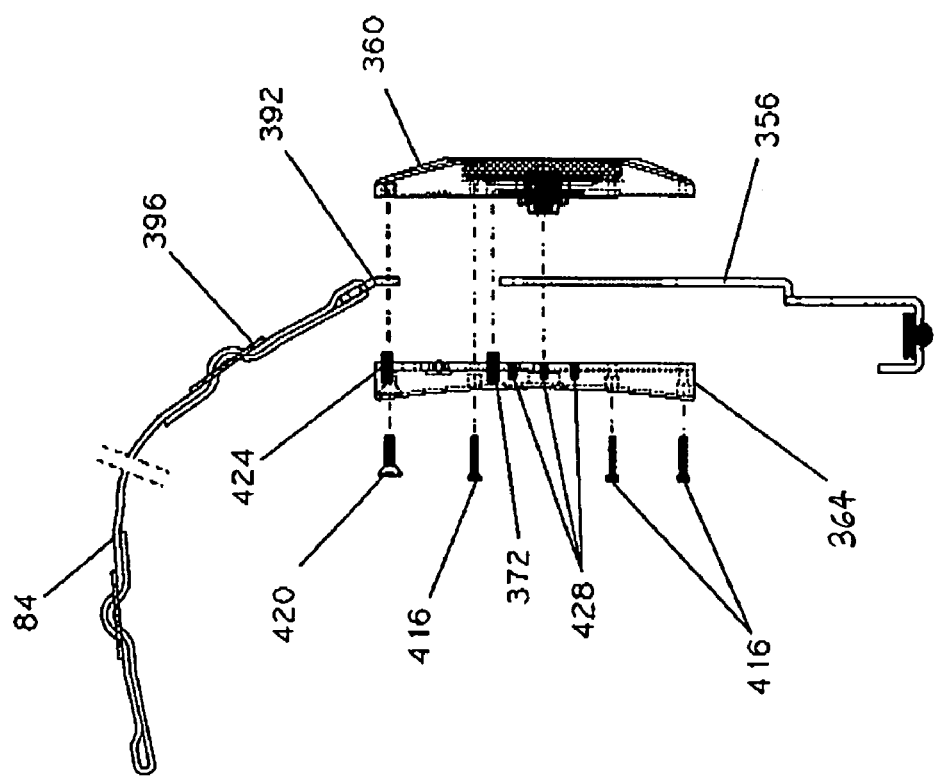
FIG. 19 is an exploded side view.
Figure 22:
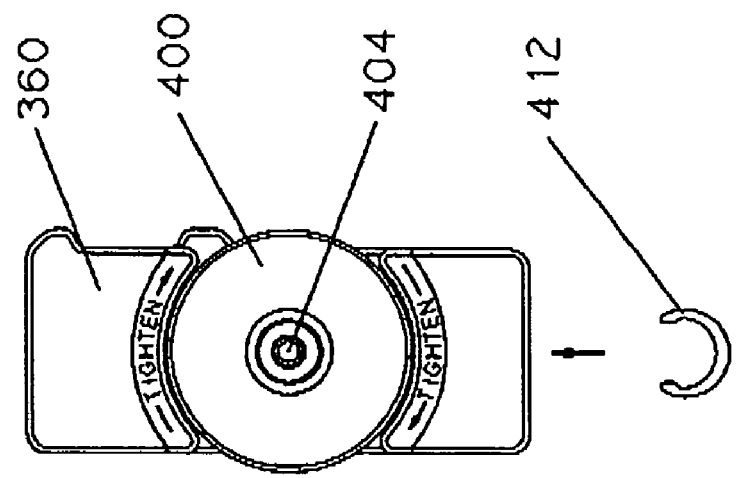
FIGS. 21 and 22 are exploded side and exploded rear views, respectively, of the cover plate assembly portion of a helmet strap ratchet assembly of the present invention.
Figure 21:
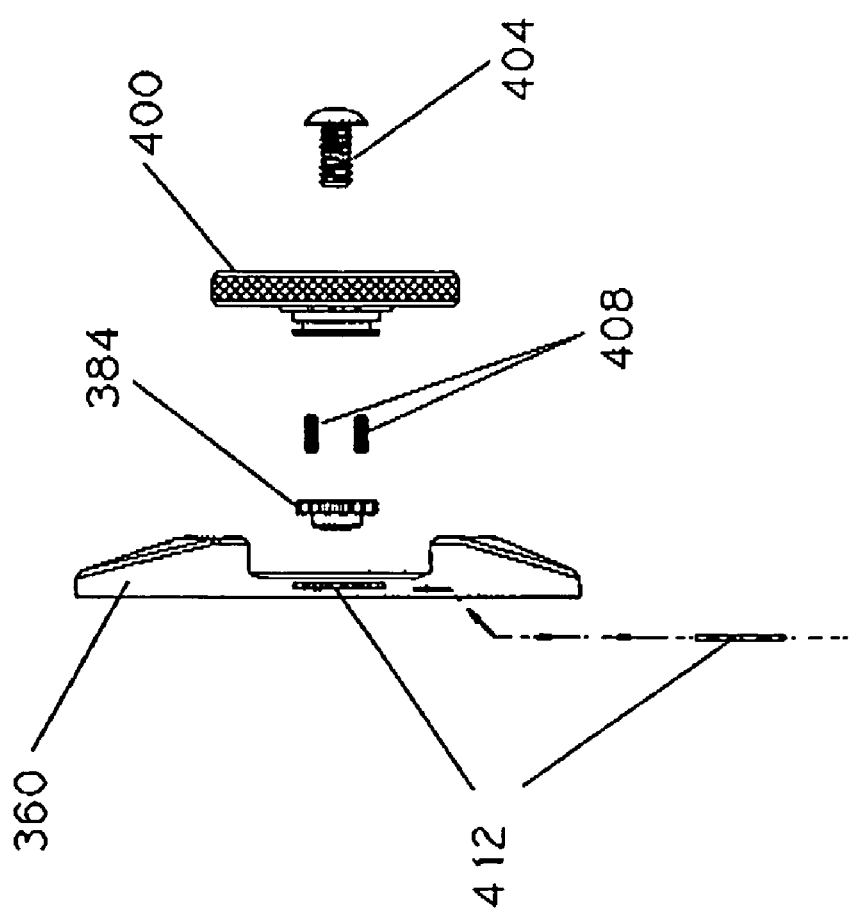
Figure 24:
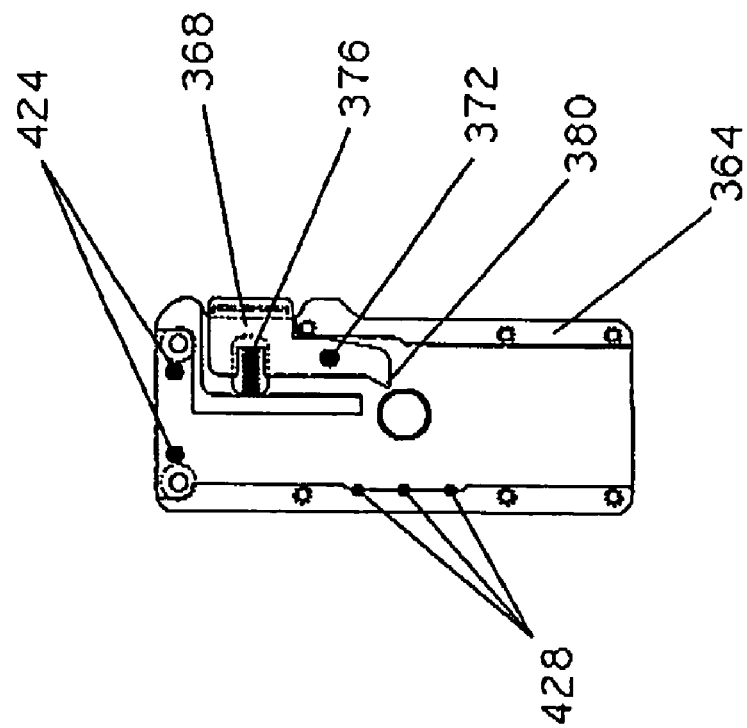
FIG. 24 is a rear view of the base assembly portion of the helmet strap ratchet assembly of the present invention.
Figure 23:
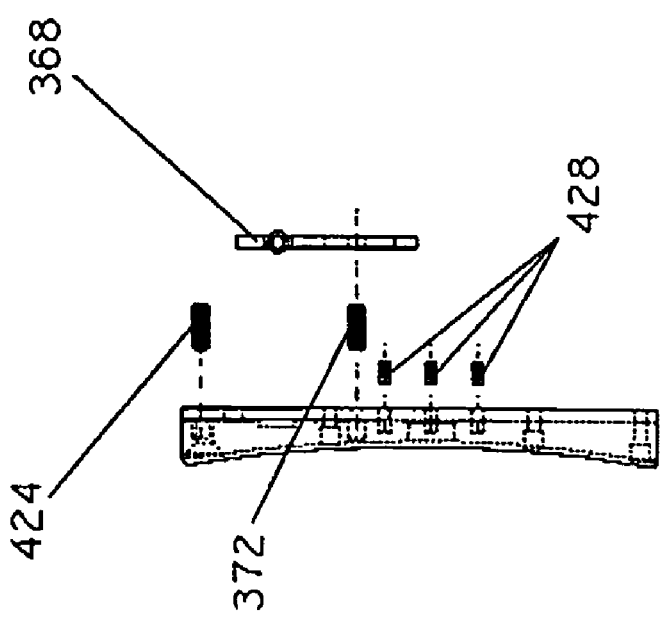
FIG. 23 is an exploded side view.
Figure 26:
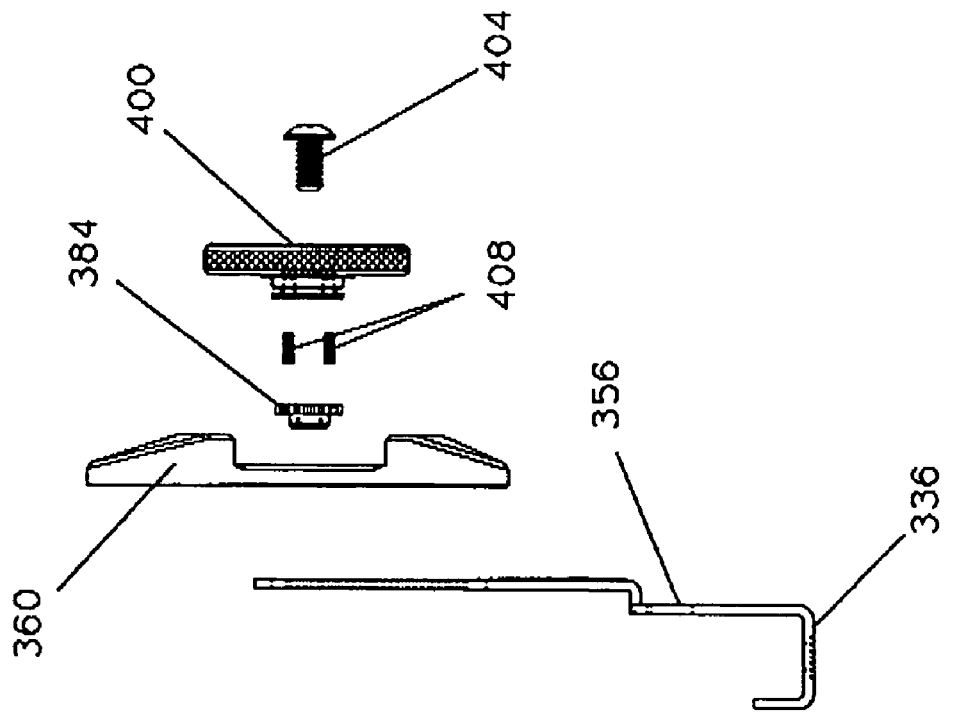
FIG. 26 is an exploded side view of the integrated gear rack shown in FIG. 25 and the ratchet system cover plate assembly.
Figure 25:
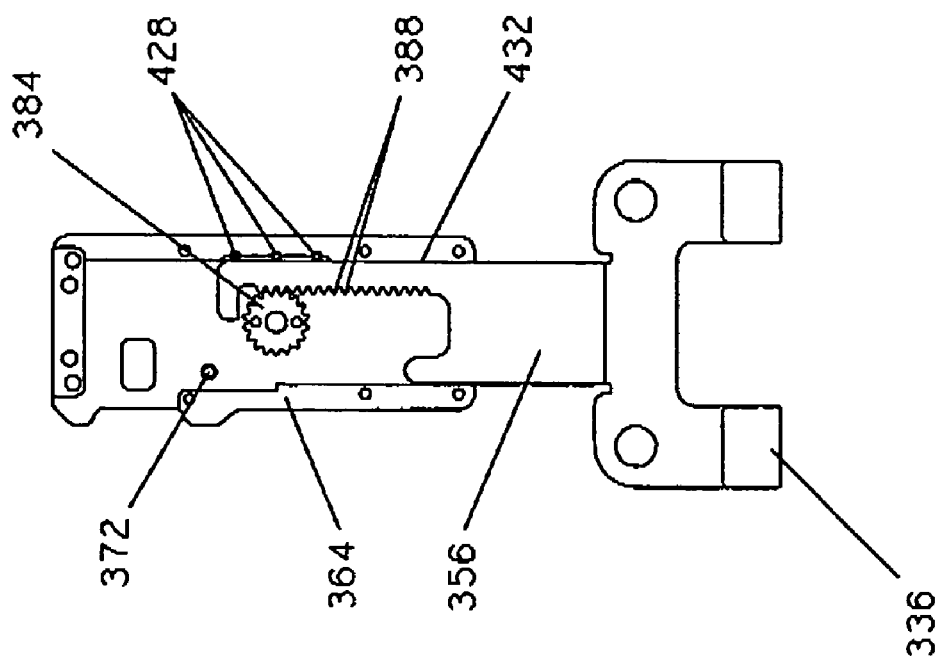
FIG. 25 is a front view of a gear rack assembly for helmet strap ratchet system, which is integral with a bracket for engaging a rear brim portion of a helmet.
Figure 27:
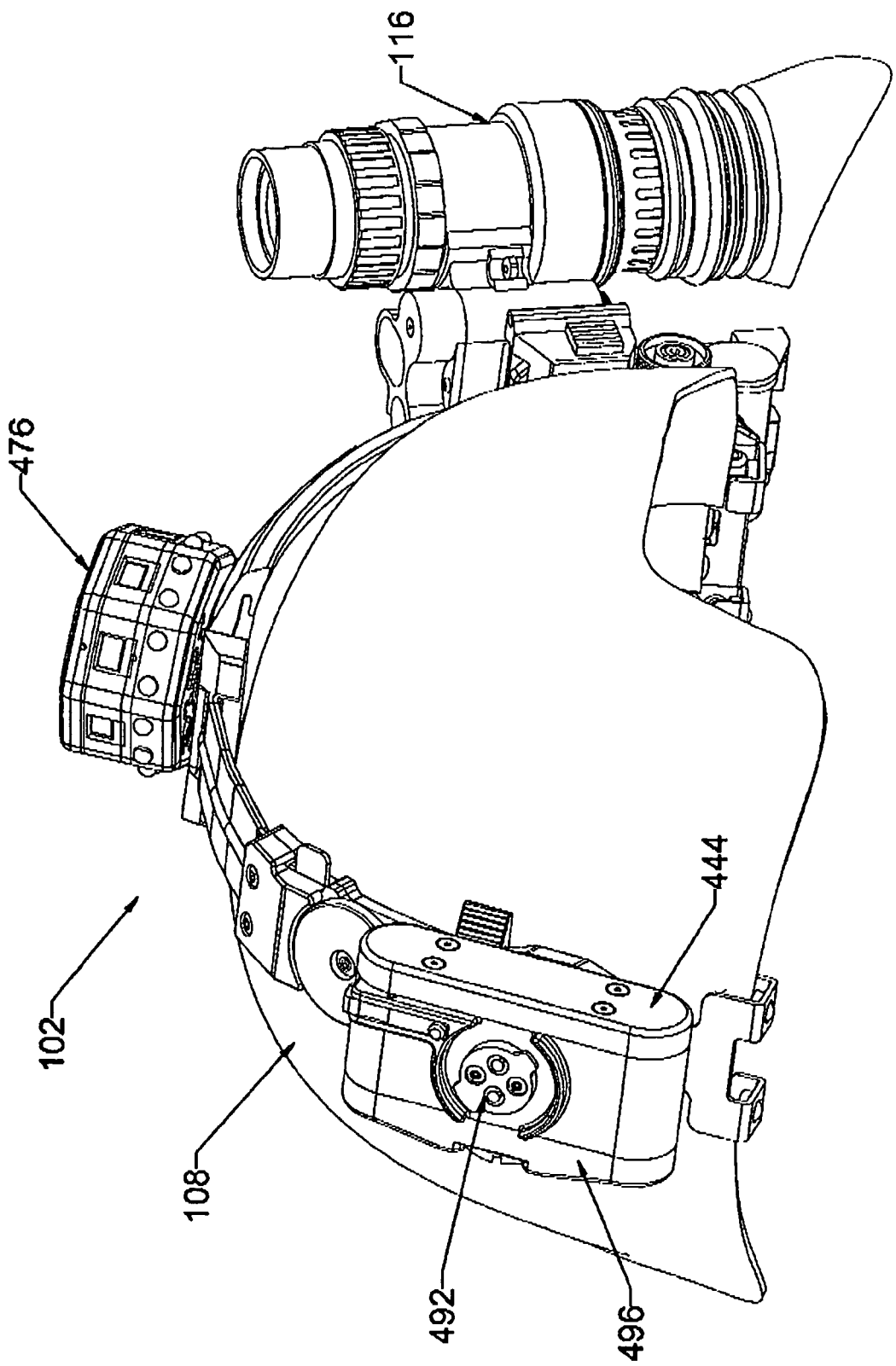
FIG. 27 is a rear perspective view of a helmet carrying a track mount system according to still another embodiment of the present invention, which may be adapted for carrying electrical components.
Figure 28:
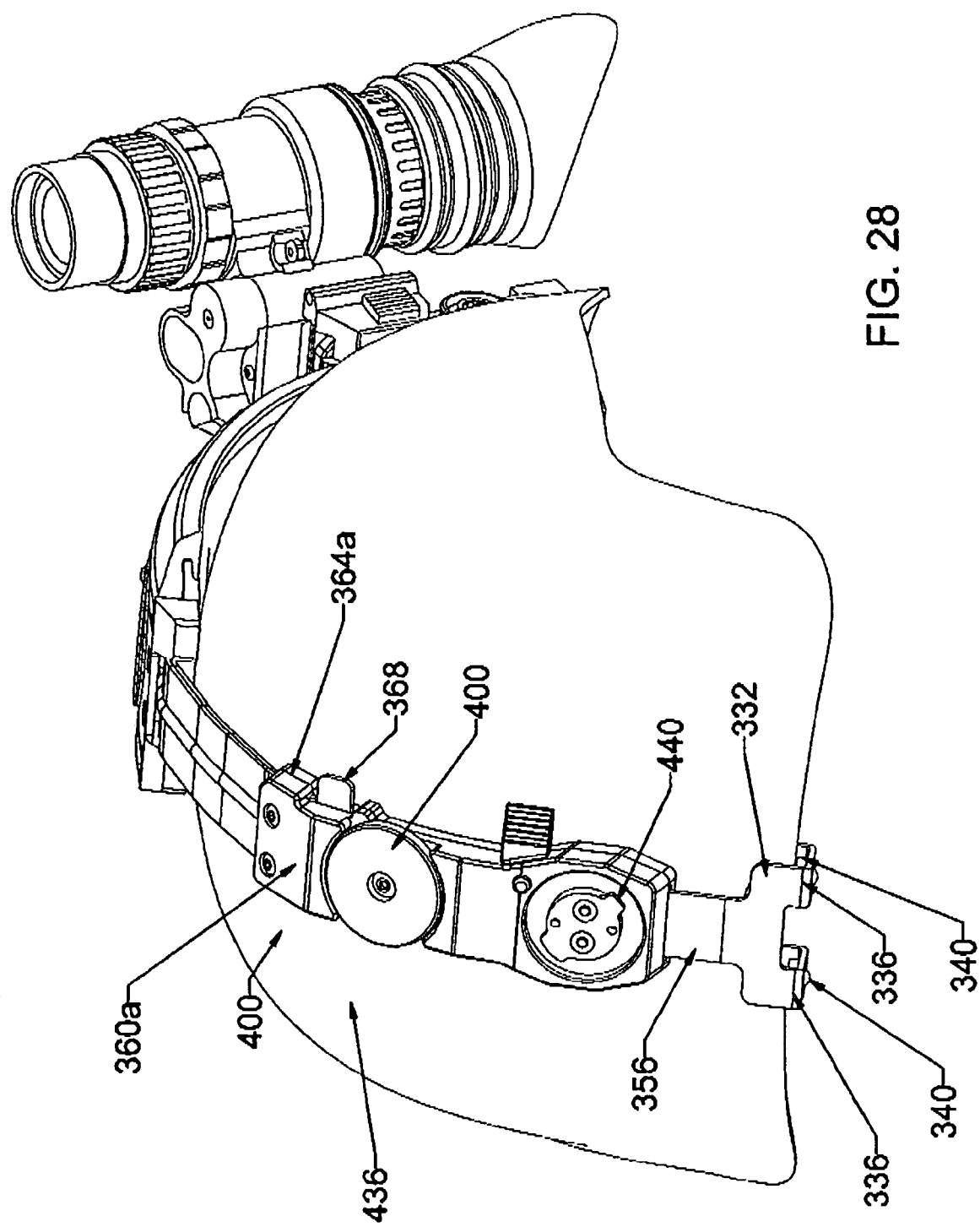
FIG. 28 is a rear perspective view of the helmet and track mount system shown in FIG. 27, wherein the electrical components are removed.
Figure 29:
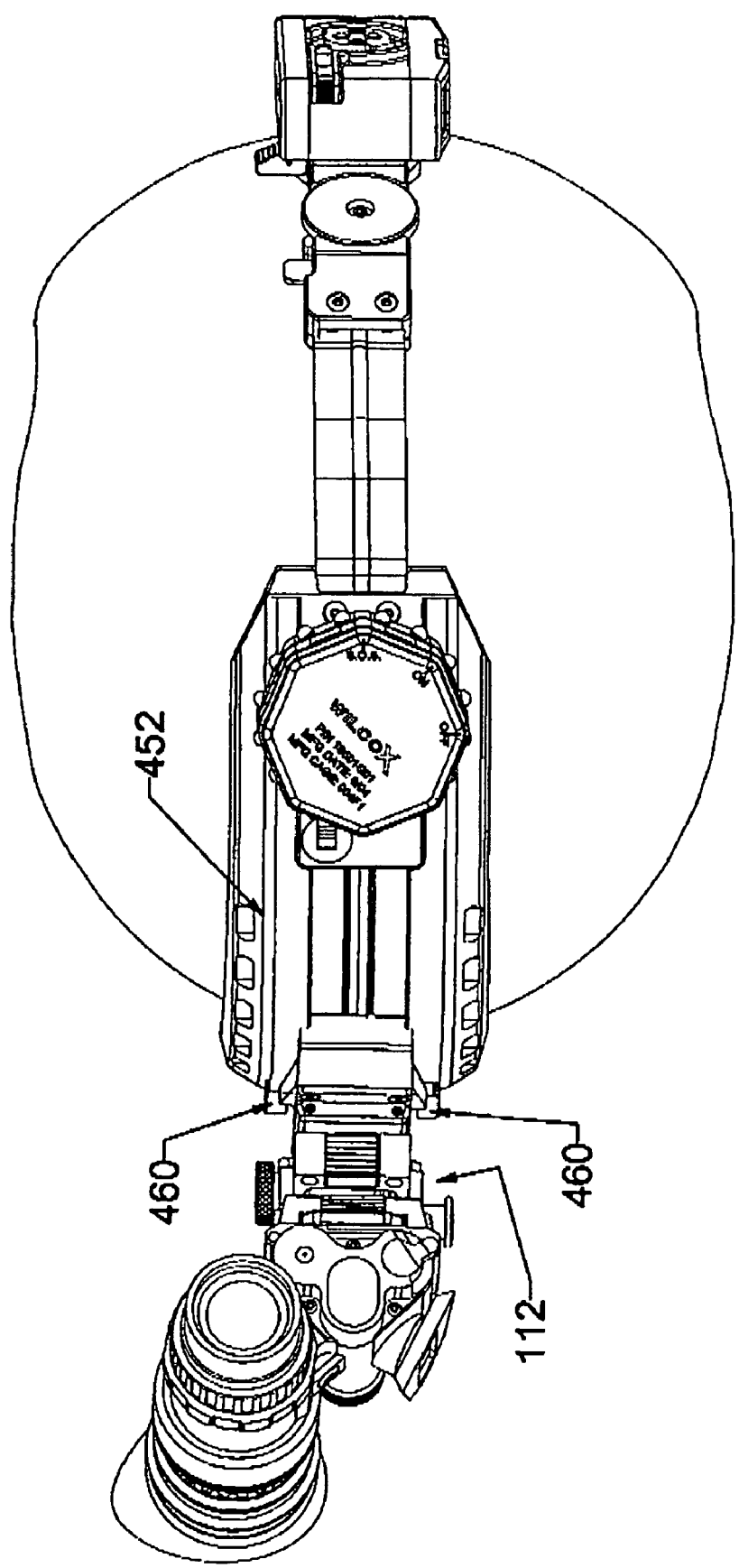
FIG. 29 is a top view of the helmet and track system shown in FIG. 27.
Figure 30:
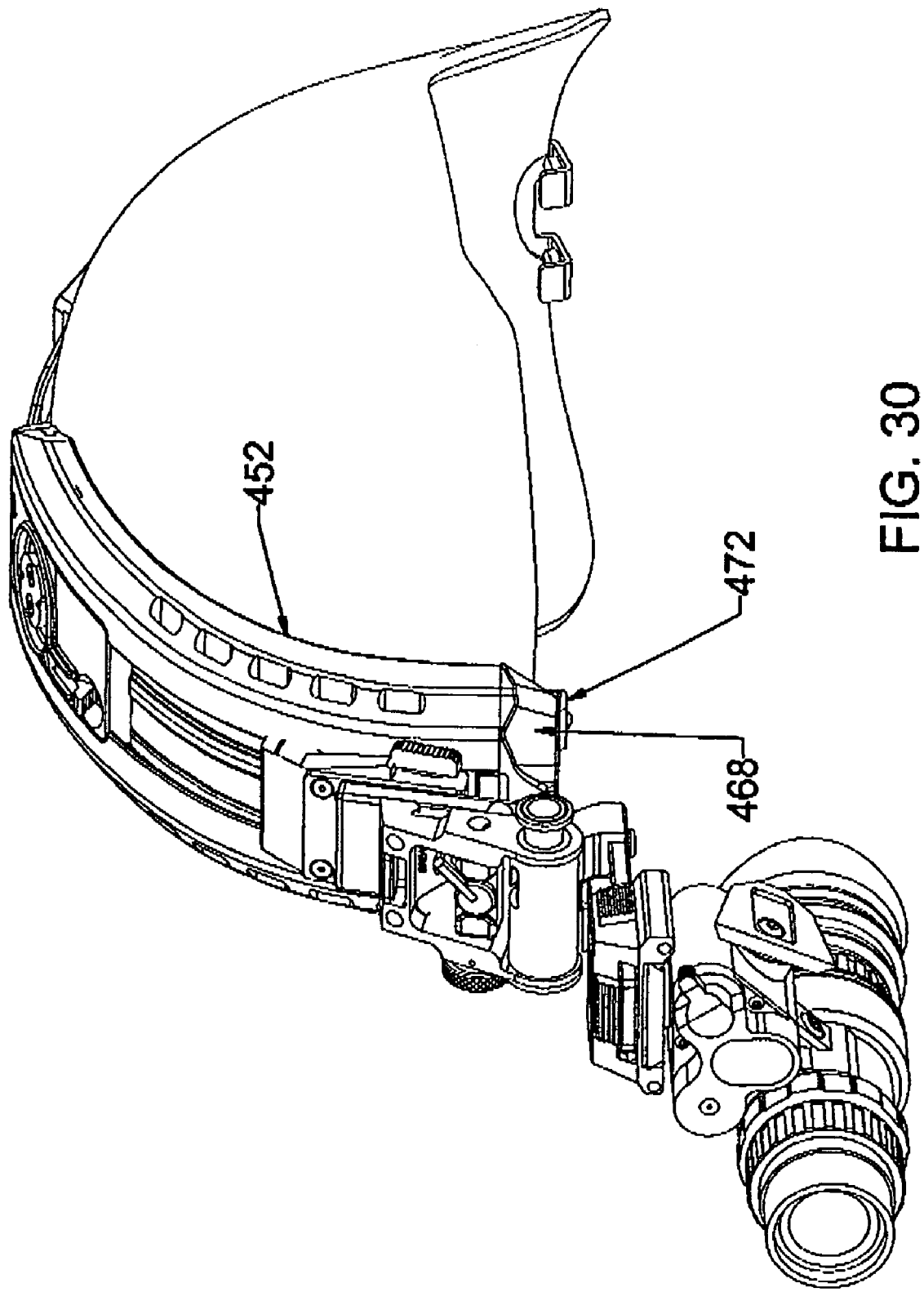
FIG. 30 is a front perspective view of the helmet and track system shown in FIG. 28, wherein the optical device is in the operational position.

Referring now to FIGS. 17 and 18, there appears a strap mount system 100c according to yet another embodiment of the present invention. A mounting plate 348 includes a plurality of fasteners 352, such as threaded fasteners, for securing the pivoting mounting assembly 112a to the front of the helmet 108 (shown in fragmentary view and in phantom lines). The mounting assembly 112a is substantially as described above with respect to mounting assembly 112, except that the sliding plate assembly 152 is permanently attached to the plate 348, i.e., such that the guide rails 132 and the release buttons 124 (see, e.g., FIGS. 3 and 4) have been omitted. A strap 324 passes along the centerline of the helmet and attaches to a rear ratchet assembly 328, which in turn attaches to the rear of helmet 108 via a wrap-around bracket 332 including laterally spaced-apart hook members 336 engaging the rear brim portion of the helmet 108. Dampening members 340 may also be provided as described above.

Referring now to FIGS. 19–26, the helmet strap ratchet system 328 according to the present invention attaches to the rear of the helmet via rear bracket 332 having wrap-around hooks 336 as described above. In the depicted embodiment, the bracket 332 is integrally formed with the gear rack 356. However, the bracket 332 and the gear rack 356 could be separately formed and secured via a strap member or other mechanical linkage.

The gear rack 356 is received within a housing comprising a cover plate 360 fastened to base plate 364. A ratchet lock 368 pivots about pin 372 and is biased via spring 376 in the locked position. Ratchet lock 368 further includes a locking member or tooth 380 engaging spur gear 384 to prevent rotation in the loosening direction (counterclockwise in the depicted embodiment), while providing a ratcheting mechanism which allows rotation of spur gear 384 in the tightening direction. Manually depressing the ratchet lock 368 disengages the tooth 380 from the spur gear 384 allowing it to rotate in the loosening direction. The spur gear 384 engages a row of teeth 388 of the gear rack 356 whereby rotating the spur gear 384 advances or retracts the gear rack 356 and, thus, loosening or tightening the strap 84. The ratchet assembly 328 further includes a slotted member 392 for receiving the strap 84 and wherein the loose end thereof may be retained, e.g., via a buckle 396. The spur gear 384 is attached to a tensioning knob 400 via a screw 404, dowel pins 408, and retaining ring 412. Spur gear 384 is rotated using the tensioning knob 400. In this manner, the mounting system may be readily adapted for a variety of helmet sizes. Also, the wearer can attach and remove the helmet mount system as needed without the need for removing the helmet. Fasteners 416, 420, and 424, such as threaded fasteners, pins, and the like, may be provided to secure the housing shell members 360 and 364 together. A plurality of spaced apart pins 428 may be provided adjacent the non-toothed edge 432 of the gear rack 356 to provide bearing points along which the surface 432 slides as the gear rack 356 is advanced and retracted.

Referring now to FIGS. 27–32, a track mounting system 102 is provided for mounting an optical device 116 as described above to the front of helmet 108. A ratcheting assembly 436 incorporating electrical connectors 440 for removably attaching a power supply 444, such as an optionally rechargeable battery or battery pack, is provided. The ratcheting assembly 436 includes a wrap-around bracket 332 for attachment to the rear brim portion of the helmet 108, which is attached to a gear rack 356.

Figure 31:
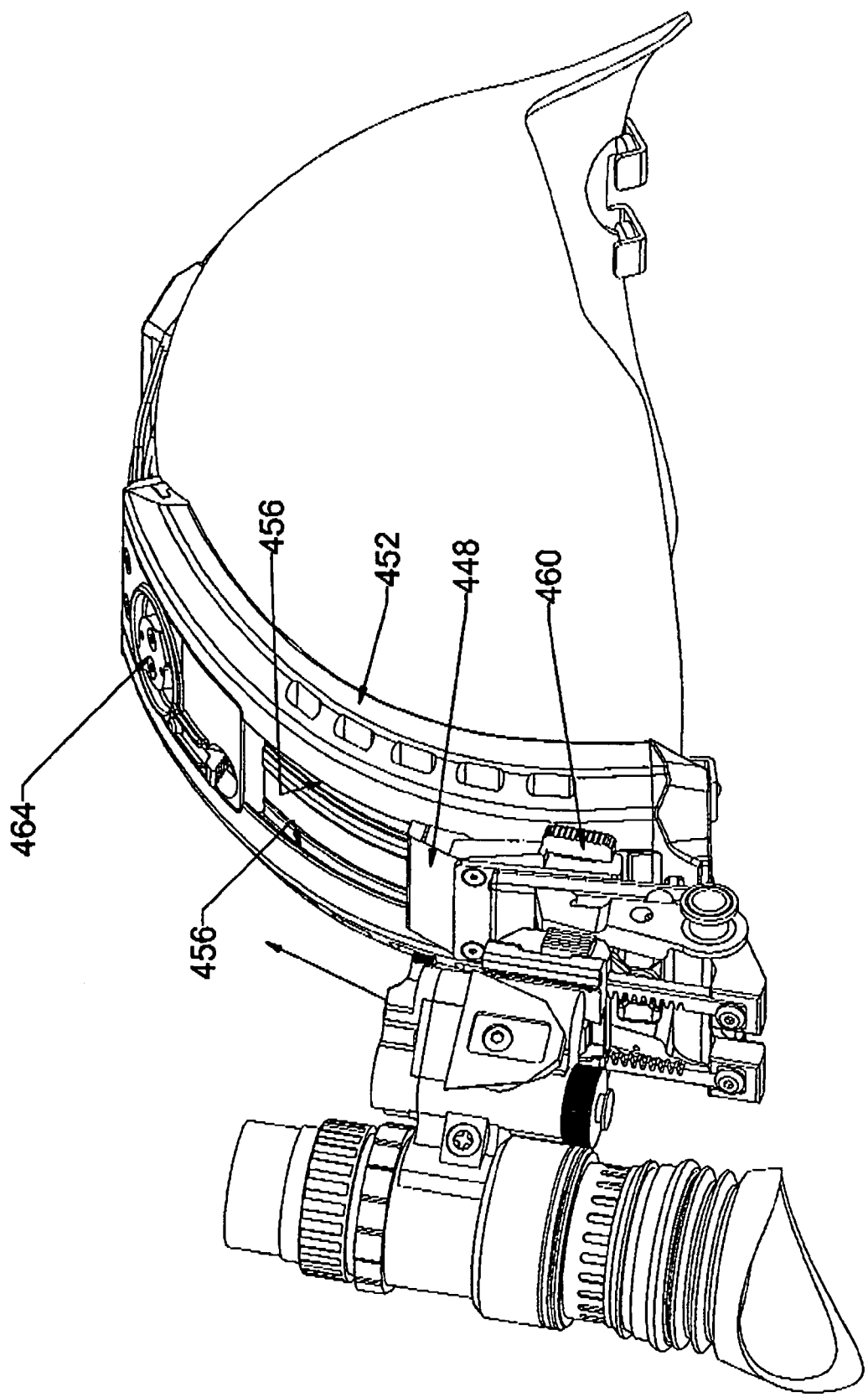
FIGS. 31 and 32 are a front and top perspective views, respectively, of the helmet and track system shown in FIG. 30, wherein the optical device is shown in the raised or flipped-up position.
Figure 32:
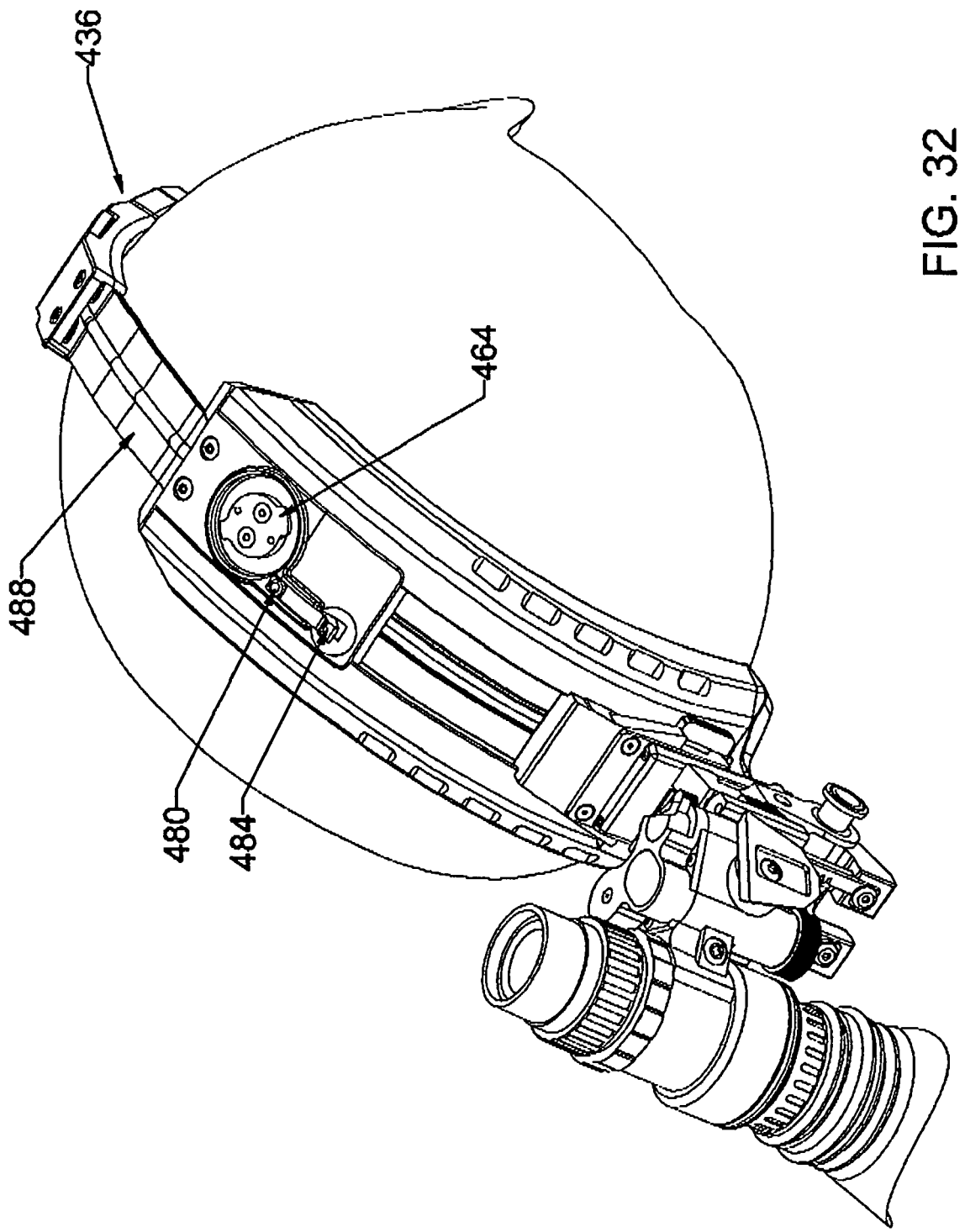

The mounting system 102 includes a bracket 448 which is slidable in track 452 as shown in FIG. 31. In addition to allowing the optical device 116 to be flipped up from the operational position (FIG. 30) to a stowed position (FIG. 31), the stowed optical device can then be further retracted by moving the entire assembly along the track 452, thereby reducing front helmet weight and providing better center of gravity so as to improve helmet balance and reduce neck fatigue in the wearer.

The sliding mount 448 includes pins, rails, or the like received within channels 456 of the track assembly 452, thereby slidably retaining the mount 448 within the track channels 456. The track assembly portion 452 may have a predetermined curvature which is adapted to fit a certain helmet type and/or size, or may be adapted to fit a variety of helmet types and sizes. The sliding mount 448 also includes quick release buttons 460 to allow the mount 448 to freely slide along the track 452. For example, the buttons 460 may operate against the urging of biasing springs to disengage the retaining members from complementary recesses formed within the track, the retaining pins being received within the recesses to provide secure retention at each end of travel along the track.

The track assembly 452 is secured to the front brim portion of the helmet 108 via a front wrap-around attachment member 468, which may be cushioned via resilient grommets 472.

Track member 452 includes and electrical connector 464, which is electrically coupled with the electrical connector 440. The electrical connector 464 may be used, for example, for attaching an identification friend-or-foe (IFF) transponder 476. Other electrically operated devices, such as communication systems, are also contemplated. The electrical connectors 464 and 440 shown are bayonet-style connectors having a resilient or retractable protrusion 480 for locking an attached device or power supply in place, e.g., by engaging a complimentary cavity or depression in an attached device. A release lever 484 is also provided to disengage the protrusion 480 to allow removal of an attached device.

A strap 488 couples the track assembly 452 and the ratchet assembly 436. The strap and ratchet assembly allow the mounting system to be sized to fit multiple helmet sizes. The strap 488 houses electrical conductors, such as wiring or conductive traces on a flexible circuit board, which electrically couple the electrical connector 440 to the connector 464, e.g., for providing power from an attached power supply 444 and an attached device such as the friend/for system 476. For example, the conductors may pass within an axial opening or channel formed in the strap. In an alternative embodiment, the strap 488 may be omitted the track assembly may be sized to span the entire helmet.

The ratchet assembly 436 attaches to the rear brim portion of the helmet via rear bracket 332 having hooks 336, preferably with resilient grommet inserts 340. The ratchet assembly 436 includes a gear rack 356 received within a housing, for example a shell type housing comprising a cover plate 360a fastened to a base plate 364a. The ratchet assembly 436 includes a ratcheting thumb wheel 400 which is normally rotatable in the tightening direction only. A ratchet lock 368 is manually depressible to disengage the ratchet mechanism from the gear rack 356, allowing the gear rack to move freely in either direction. The ratchet mechanism may be substantially as shown and described above by way of reference to the ratchet mechanism 328 shown in FIGS. 19–26.

The ratchet assembly 436 additionally includes electrical connector 440 for attaching power supply 444 and is electrically coupled to the connector 464 on the track assembly 352 via conductors passing within the strap 488. In the depicted embodiment, the electrical connector 440 is a male bayonet style connector which engages a complementary female bayonet connector on the battery or battery pack 444.

The depicted battery pack 444 may house one or more batteries and preferably contains a female bayonet connector on a first side for connecting to the connector 440 and a male connector 492 on the opposite side of the unit to allow multiple battery packs 444 to be connected in parallel, e.g., to provide longer battery life. A removable cover 496 allows batteries contained within the battery pack 444 to be replaced.

In a preferred embodiment, where a night vision scope or other electronically operated optical device is employed, such optics will typically employ a self-contained power supply and, therefore, do not need to receive power from the helmet mounted power supply 444. However, in certain embodiments, it is contemplated that an electrical connection between the battery connector 440 and the bracket 448 be provided to power an attached electronically operated optical device.

Figure 33:
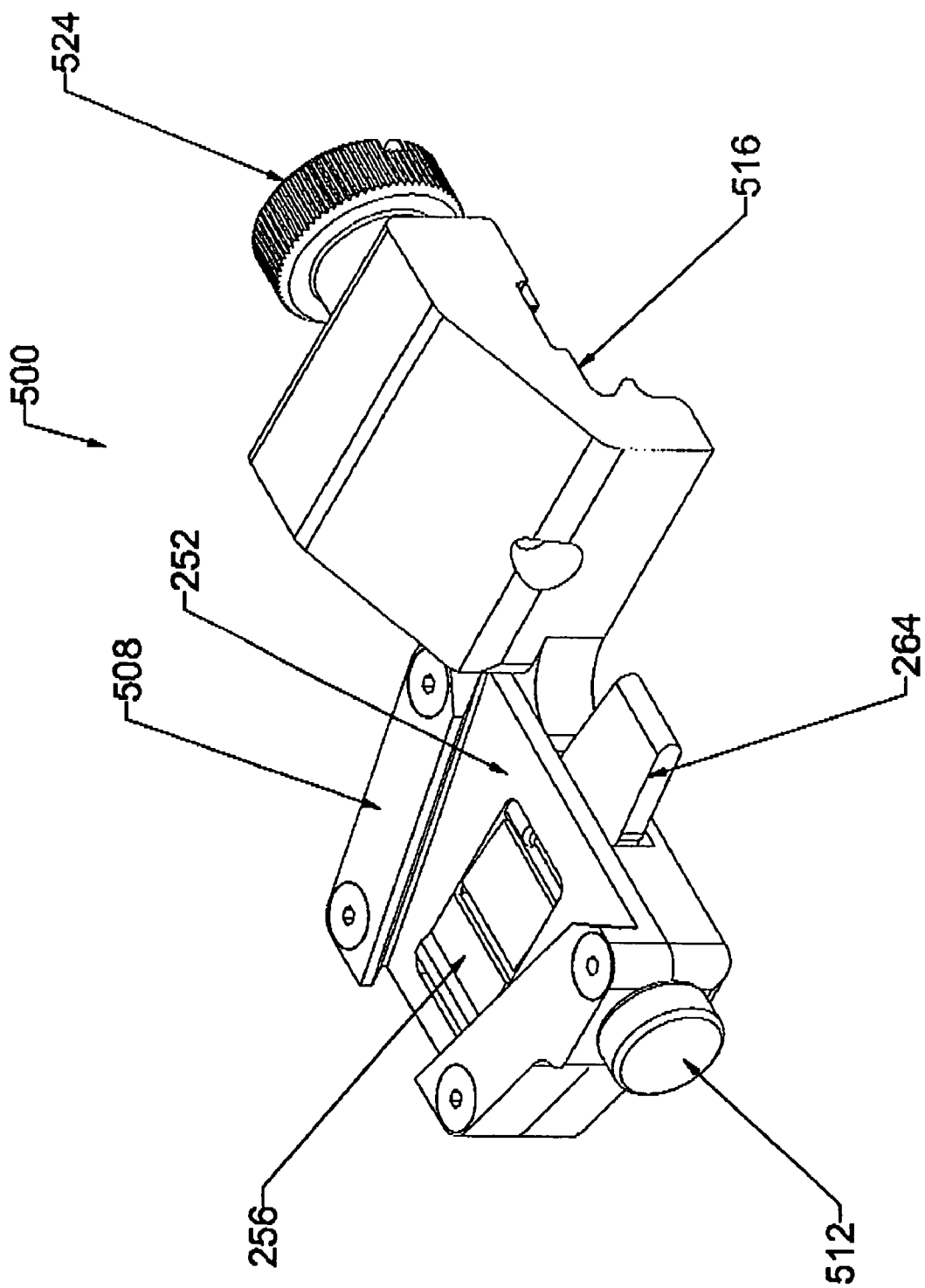
FIG. 33 is a top perspective view of an optic mount adapter for attaching a helmet mounted optical device to a weapon mount system.
Figure 34:
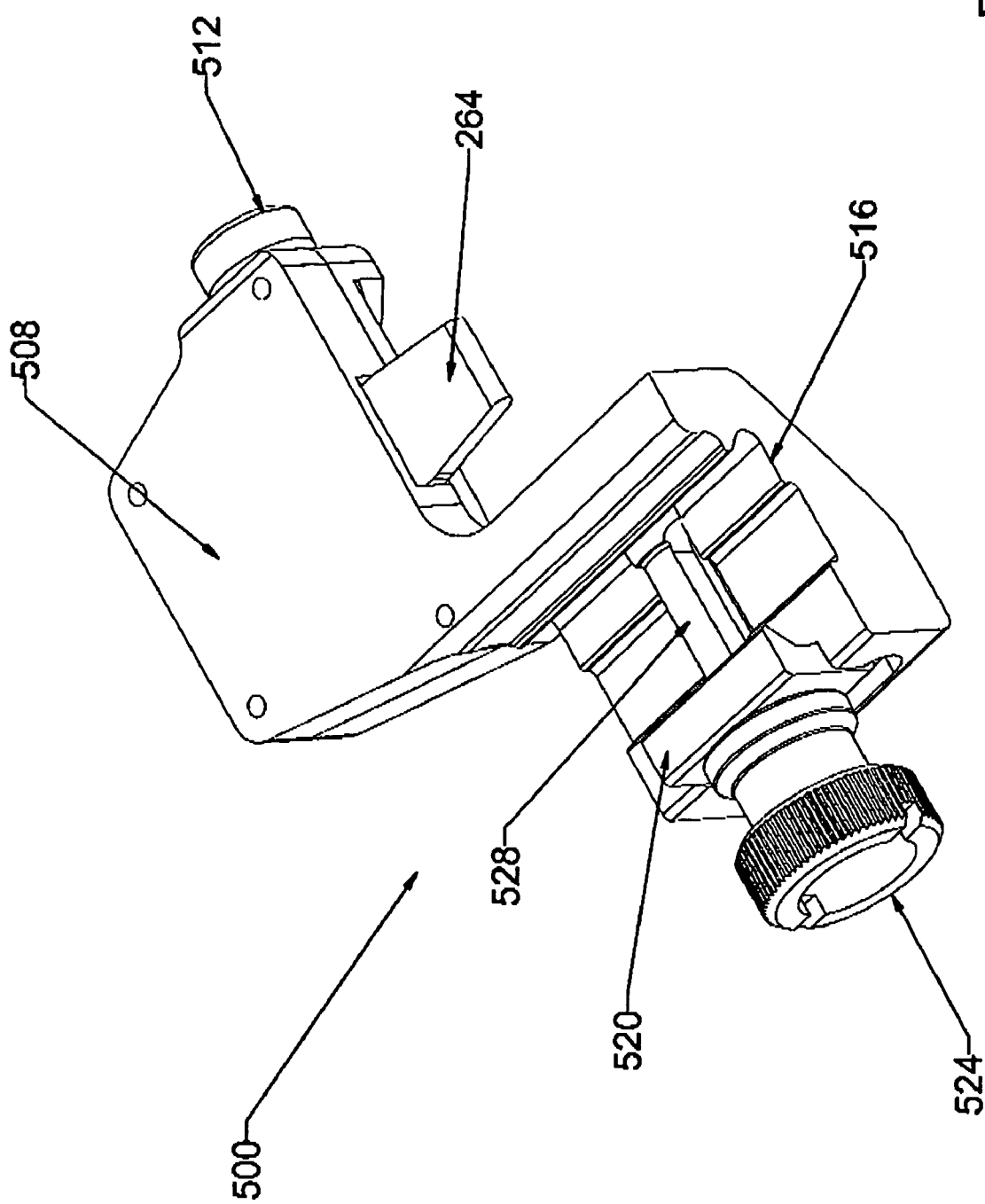
FIG. 34 is a bottom perspective view of the adapter shown in FIG. 33.
Figure 35:
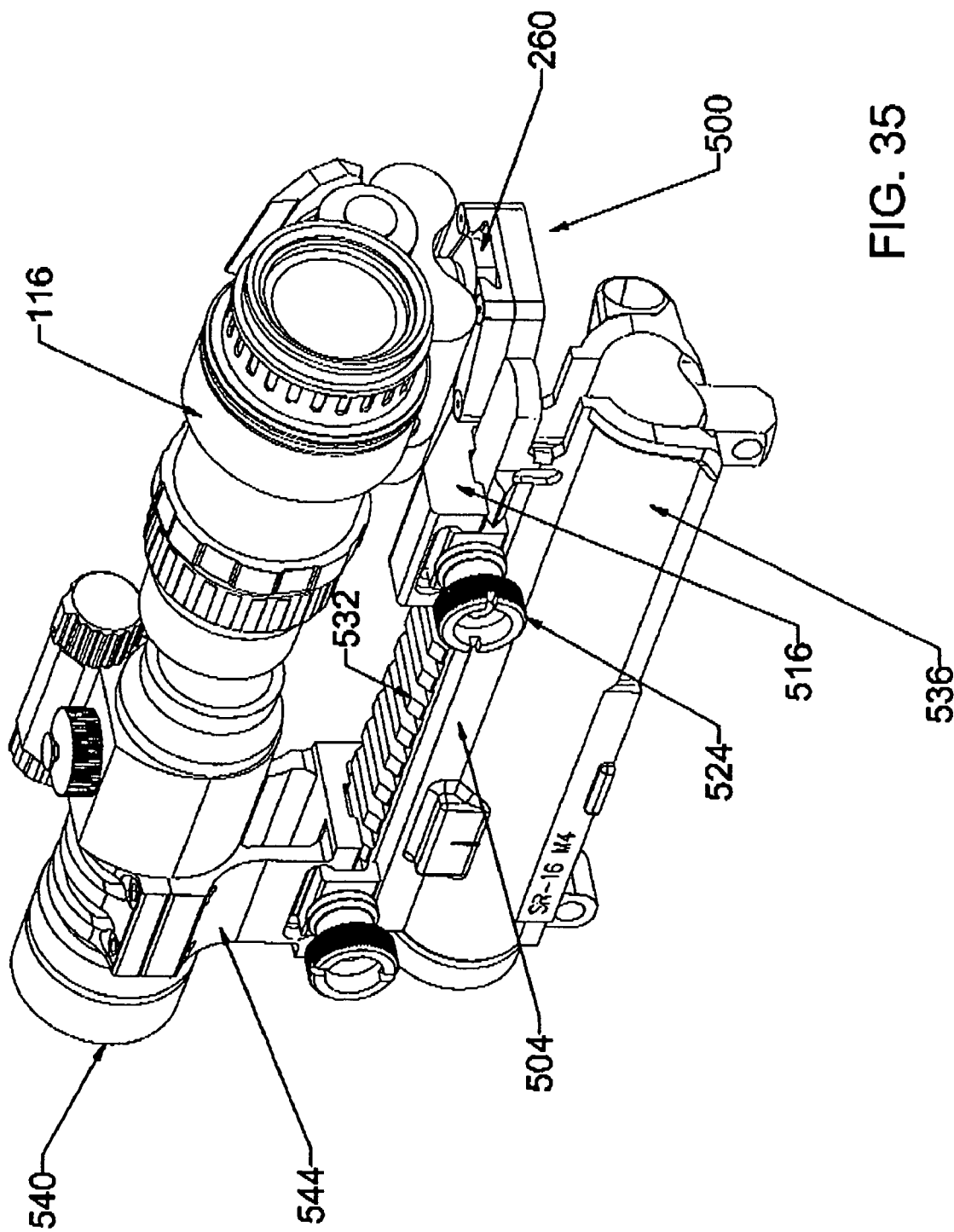
FIG. 35 is a fragmentary view of a weapon system employing the adapter shown in FIG. 33 wherein a night vision tube is mounted in optical alignment with a reflex sight.

Referring now to FIGS. 33–35, a weapon mount 500 for attaching an optical device to a weapon system is shown. This device allows an operator to quickly transfer an optical device, such as a helmet mounted optical device 116, for shared use between a helmet mounting system, e.g., as described herein, and a weapon system. Although the illustrated weapon mount 500 is shown in connection with a Picatinny rail system (e.g., MIL-STD-1913) 504, it will be recognized that the weapon mount 500 may be adapted for use with all manner firearms, including without limitation rifles, handguns, machine guns, mortars, etc., and all manner of weapon accessory mount rail interfaces or other mounting system types.

The weapon mount 500 includes an optic mount 508 having a trapezoidal mounting shoe 252 for receiving a complimentary mounting foot 248 (see FIG. 9) of an optical device 116. A locking member 256 is resiliently biased to engage a complementary recess 260 located on the mounting foot 248 (see FIG. 9). The trapezoidal shoe opens away from the operator, thus preventing slippage in the event of weapon recoil. An unlocking lever 264 is provided which can be used to manually disengage locking member 256 against the biasing of an internal spring (not shown) to release the optics from the mounting unit. A lock release button 512 may additionally be provided to maintain the locking member 256 in the locked position, for use in conjunction with lever 264 to release the optical device from the shoe portion 508, e.g., to prevent disengagement of the optics due to recoil of the weapon. A rail clamp portion 516 of the weapon mount 500 attaches to a weapon rail 504 and includes a floating rail grabber 520 which is secured to the rail system via thumb screw 524. A locator pin 528 engages a selected one of the recoil grooves 532 in the rail 504.

FIG. 35 depicts a preferred embodiment wherein the weapon 536 includes a reflex sight 540 of a type employing a light source for projecting a dot or other target designator, used in conjunction with a night vision tube 116 to provide night-time or low-light targeting capability. The reflex sight 540 is secured to the rail system 504 via a rail mount 544. In operation, mount 500 may be preattached to the rail 504, whereby the night vision tube may readily be transferred between a helmet mount system and the rail mount 500, wherein it is in optical alignment with the reflex sight 540. In this manner, the reflex sight target designator is projected and superimposed by the eye of the viewer on the image generated by the night vision scope 116.

The invention has been described with reference to the preferred embodiments. Modifications and alterations will occur to others upon a reading and understanding of the preceding detailed description. It is intended that the invention be construed as including these and other modifications and alterations insofar as they come within the scope of the appended claims or the equivalents thereof. All references cited herein are incorporated herein by reference in their entireties.

Having thus described the preferred embodiments, the invention is now claimed to be:

1. A helmet mount for an optical device, comprising:
    a mounting plate for attaching the helmet mount to the front of a helmet;
    a gear rack system connected to the mounting plate for adjusting a vertical position of the optical device relative to a user's eyes;
    a first pivot arm coupled to the gear rack system;
    a connector for securing the gear rack system to the first pivot arm, said connector selectively configurable between breakaway and nonbreakaway configurations;
    a second pivot arm pivotally attached to the first pivot arm for supporting said optical device alternatively between a first, operational position in front of the user's eyes and a second, stowed position above the user's line of sight;
    a pair of guide rails extending generally horizontally when the second pivot arm is in said first, operational position; and
    a carriage member slidable along said guide rails and adapted to carry said optical device, said carriage member for adjusting a horizontal position of the optical device in front of the user's eyes.

2. The helmet mount of claim 1, wherein the mounting plate is fastened to the helmet via one or more screw-type fasteners, a hook-type fastener having one or more hooks adapted to attach to a brim portion of the helmet, or a combination thereof.

3. The helmet mount of claim 1, wherein said connector comprises a protrusion engaging an aligned, complimentary opening in said first pivot arm, wherein said protrusion is resiliently depressible when said connector is in said breakaway configuration and said protrusion is rigid and nondepressible when said connector is in said nonbreakaway configuration.

4. The helmet mount of claim 3, further comprising:
    a manually actuatable lever for alternatively configuring said connector in said breakaway and nonbreakaway configurations.

5. A helmet mount for an optical device, comprising:
    a mounting plate for attaching the helmet mount to the front of a helmet;
    a pivoting assembly for selectively positioning said optical device between a first, operational position in front of the user's eyes and a second, stowed position away from the user's eyes;
    a rear bracket comprising at least one hook adapted to attach to a rear brim portion of the helmet;
    a strap attached to the mounting plate for securing the helmet mount to the helmet; and
    a rotating ratchet assembly attached to said strap for adjusting tension in said strap.

6. The helmet mount of claim 5, wherein said ratchet assembly includes:
    a gear rack attached to said rear bracket and slidably retained in a housing;
    a spur gear engaging said gear rack;
    said spur gear manually rotatable by a user wherein rotation of said spur gear in a first direction retracts said gear rack to tighten said strap and rotation of said spur gear in a second direction opposite the first direction advances said spur gear to loosen said strap; and
    a locking member normally engaging said spur gear to permit rotation of said spur gear in the first direction only;
    a release lever for disengaging said locking member from said spur gear to permit rotation of the spur gear in the second direction and loosening of said strap.

7. The helmet mount of claim 5, wherein said pivoting portion comprises:
    a gear rack system connected to the mounting plate for adjusting a vertical position of the optical device relative to a user's eyes;
    a first pivot arm coupled to the gear rack system;
    a second pivot arm pivotally attached to the first pivot arm for supporting said optical device alternatively between a first, operational position in front of the user's eyes and a second, stowed position above the user's line of sight;
    a pair of guide rails extending generally horizontally when the second pivot arm is in said first, operational position;
    a carriage member slidable along said guide rails and adapted to carry said optical device, said carriage member for adjusting a horizontal position of the optical device in front of the user's eyes.

8. The helmet mount of claim 7, further comprising:
    a connector for securing the gear rack system to the first pivot arm, said connector selectively configurable between breakaway and nonbreakaway configurations.

* * * * *